US010656175B2

(12) United States Patent
Dharmasena et al.

(10) Patent No.: US 10,656,175 B2
(45) Date of Patent: May 19, 2020

(54) CANTILEVER FOR ATOMIC FORCE MICROSCOPY

(71) Applicants: Ohio State Innovation Foundation, Columbus, OH (US); The Board of Trustees of the University of Illinois, Urbana, IL (US)

(72) Inventors: Sajith M. Dharmasena, Nawala (LK); Seok Kim, Champaign, IL (US); Lawrence A. Bergman, Champaign, IL (US); Alexander F. Vakakis, Champaign, IL (US); Hanna Cho, Dublin, OH (US)

(73) Assignees: Ohio State Innovation Foundation, Columnbus, OH (US); The Board of Trustees of the University of Illinois, Urbana, IL (US)

( * ) Notice: Subject to any disclaimer, the term of this patent is extended or adjusted under 35 U.S.C. 154(b) by 27 days.

(21) Appl. No.: 15/896,199

(22) Filed: Feb. 14, 2018

(65) Prior Publication Data

US 2018/0231581 A1     Aug. 16, 2018

Related U.S. Application Data

(60) Provisional application No. 62/458,699, filed on Feb. 14, 2017.

(51) Int. Cl.
*G01Q 60/38* (2010.01)
*G01Q 70/10* (2010.01)

(52) U.S. Cl.
CPC ............. *G01Q 60/38* (2013.01); *G01Q 70/10* (2013.01)

(58) Field of Classification Search
CPC .............................. G01Q 60/38; G01Q 70/10
USPC ................................................ 850/33, 40, 42
See application file for complete search history.

(56) References Cited

U.S. PATENT DOCUMENTS

| 7,533,561 | B2 * | 5/2009 | Beyder | B82Y 35/00 |
| | | | | 73/105 |
| 7,979,916 | B2 * | 7/2011 | Pittenger | G01Q 60/38 |
| | | | | 850/21 |
| 8,250,668 | B2 | 8/2012 | Holscher et al. | |
| 8,387,443 | B2 * | 3/2013 | King | G01Q 60/38 |
| | | | | 73/105 |

(Continued)

OTHER PUBLICATIONS

Jeong, et al ("Utilizing intentional internal resonance to achieve multi-harmonic atomic force microscopy," Nanotechnology 2016, 27, 125501) (Year: 2016).*

(Continued)

*Primary Examiner* — Michael Maskell
(74) *Attorney, Agent, or Firm* — Meunier Carlin & Curfman LLC

(57) ABSTRACT

A cantilever system for use in an atomic force microscope (AFM) is disclosed. The cantilever system comprises a base cantilever portion and a paddle connected to the base cantilever portion with one end free to move relative to the base cantilever portion. The base cantilever portion has an effective bending stiffness, $k_1$, and the paddle has an effective bending stiffness, $k_2$. The ratio of the effective bending stiffness, $k_1$, to the bending stiffness, $k_2$, is at least greater than 4. Such a cantilever system provides a stable, i.e., invariant contact resonant frequency, independent of the changes in the local contact stiffness.

9 Claims, 19 Drawing Sheets

(56) References Cited

U.S. PATENT DOCUMENTS

2011/0041224 A1* 2/2011 Raman .................. B82Y 35/00
850/40
2011/0067150 A1* 3/2011 Holscher ................ B82Y 35/00
850/33

OTHER PUBLICATIONS

Jeong, B.; Pettit, C.; Dharmasena, S.; Keum, H.; Lee, J.; Kim, J.; Kim, S.; McFarland, D. M.; Bergman, L. A.; Vakakis, A. F.; Cho, H. Utilizing Intentional Internal Resonance to Achieve Multi-Harmonic Atomic Force Microscopy. Nanotechnology 2016, 27, 125501.
Potekin, R.; Dharmasena, S.; McFarland, D. M.; Bergman, L. A.; Vakakis, A. F.; Cho, H. Cantilever Dynamics in Higher-Harmonic Atomic Force Microscopy for Enhanced Material Characterization. Int. J. Solids Struct. 2017, 110-111, 332-339.
Kjoller, K.; Felts, J. R.; Cook, D.; Prater, C. B.; King, W. P. High-Sensitivity Nanometer-Scale Infrared Spectroscopy Using a Contact Mode Microcantilever with an Internal Resonator Paddle. Nanotechnology 2010, 21, 185705.
Felts, J. R.; King, W. P. Mechanical Design for Tailoring the Resonance Harmonics of an Atomic Force Microscope Cantilever during Tip—surface Contact. J. Micromechanics Microengineering 2009, 19, 115008.
Shaik, N. H.; Reifenberger, R. G.; Raman, A. Enhancing the Optical Lever Sensitivity of Microcantilevers for Dynamic Atomic Force Microscopy via Integrated Low Frequency Paddles. Nanotechnology 2016, 27, 195502.
Shaik, N. H.; Reifenberger, R. G.; Raman, A. Microcantilevers with Embedded Accelerometers for Dynamic Atomic Force Microscopy. Appl. Phys. Lett. 2014, 104, 083109.
Lee, D. W.; Ono, T.; Esashi, M. Cantilever with Integrated Resonator for Application of Scanning Probe Microscope. Sens. Actuators, A 2000, 83, 11-16.
Solares, S. D.; Holsher, H. Numerical Analysis of Dynamic Force Spectroscopy Using a Dual-Oscillator Sensor. J. Vac. Sci. Technol. B 2010, 28, C4E1.
Koops, R.; Fokkema, V. An Approach Towards 3D Sensitive AFM Cantilevers. Meas. Sci. Technol. 2014, 25, 044001.
Potekin, R.; Dharmasena, S.; Keum, H.; Jiang, X.; Lee, J.; Kim, S.; Bergman, L. A.; Vakakis, A. F.; Cho, H. Multi-Frequency Atomic Force Microscopy Based on Enhanced Internal Resonance of an Inner-Paddled Cantilever. Sens. Actuators, A 2018, 273, 206-220.
Zeyen, B.; Virwani, K.; Pittenger, B.; Turner, K. L. Preamplifying Cantilevers for Dynamic Atomic Force Microscopy. Appl. Phys. Lett. 2009, 94, 103507.
Jeong, B., "Constructive Utilization of Intentional Nonlinearity in Systems of Coupled Micro/Nonmechanical Resonators," Diss., Univ. of Illinois at Urbana-Champaign, 2014 (183 pages).
Pettit et al., "Microcantilever System Incorporating Internal Resonance for Multi-Harmonic Atomic Force Microscopy," IEEE, MEMS 2015, Estoril, Portugal, Jan. 18-22, 2015, pp. 752-755.

\* cited by examiner

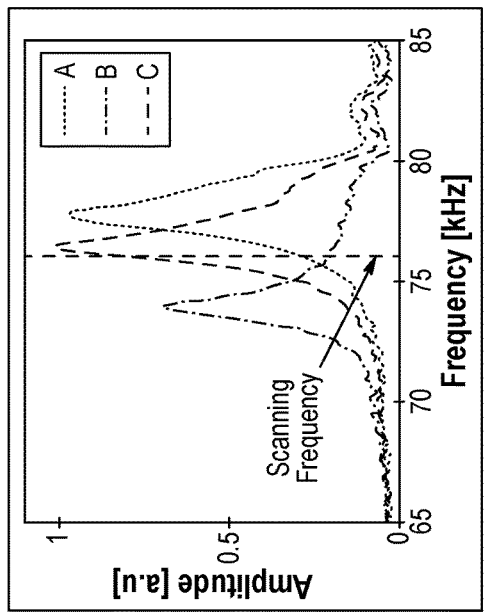
FIG. 5A
FIG. 5B
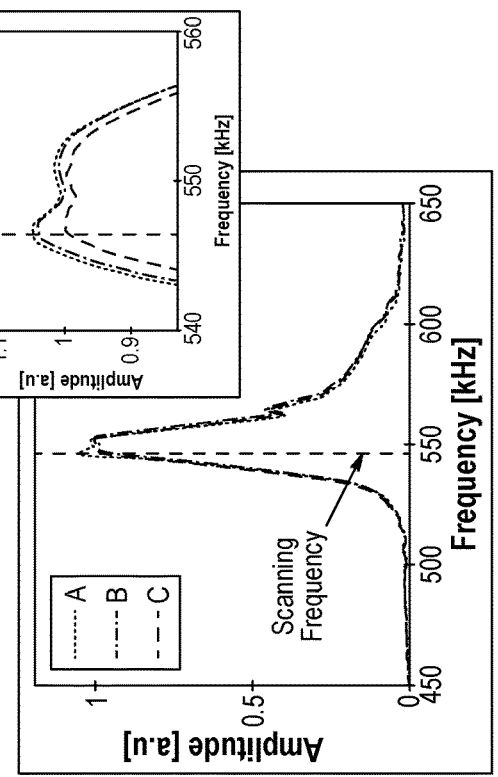
FIG. 5C
FIG. 5D

CANTILEVER FOR ATOMIC FORCE MICROSCOPY

RELATED APPLICATION

The Present application claims priority to U.S. Ser. No. 62/458,699 filed Feb. 14, 2017, the disclosure of which is hereby incorporated herein by reference in its entirety.

FIELD OF THE INVENTION

The invention relates generally to cantilevers for use in atomic force microscopy, and more particularly, to dual-frequency cantilevers for use in atomic force microscopy.

BACKGROUND OF THE INVENTION

Detecting and characterizing nanoscale material functionalities of emerging materials is of growing interest as it is critical for the advancement of nano- and bio-technology. Atomic force microscopy (AFM) is one technique for obtaining nano-scale information on functional materials and structures. Since AFM was developed as a topographical imaging technique, the capabilities of AFM-based techniques have been extended to include nano-scale mapping of various material characteristics such as electrical, material, chemical, electrochemical, and electromechanical properties over a broad range of materials, leading to advances in many fields including material science, physics, bio-mechanics, chemistry, and life sciences.

The traditional approach to AFM functional imaging involves the use of lock-in amplifiers to determine the amplitude and phase of the cantilever response at a single well-defined excitation frequency. The input to activate the material functionality can be in the form of a harmonic excitation applied to the base of the sample or directly to the tip, while the resulting cantilever deflections provide a measure of the functional properties of the sample. Depending on the functional response under investigation, the cantilever tip needs to remain in contact with the sample over the entirety of the oscillation cycle in a format known as Contact AFM (C-AFM) or over none of the oscillation cycle in a format known as Non-Contact AFM (NC-AMF). The C-AFM approach is the functional basis of AFM techniques such as Piezoresponse Force Microscopy (PFM), Electrochemical Strain Microscopy (ESM), and Infrared Spectroscopy (AFM-IR), in which the dimensional changes of a sample in response to the functional input are measured by the tip in contact. Similarly, NC-AFM is used in Electrostatic Force Microscopy (EFM), Kelvin Probe Force Microscopy (KPFM), and Magnetic Force Microscopy (MFM), in which the reacting force with respect to functional properties is measured by the non-contact tip.

The intrinsic limitation of many functional AFM techniques is the low Signal-to-Noise Ratio (SNR), especially when measuring materials of lower responsivity. One approach to improve the SNR is to increase the strength of the excitation. However, using a higher excitation input may be undesirable in many applications. For example, the high voltage input in PFM may cause polarization switching in ferroelectric materials or even damage to the sample. Alternatively, the SNR can be improved by utilizing resonance of the cantilever. By operating the cantilever near resonance, the cantilever response can be increased by a factor of 10~100 (i.e., the Q factor of the cantilever resonance), thus significantly improving the SNR. Operating near resonance has proven beneficial in many AFM techniques such as single-frequency PFM, AFM-IR, KPFM, Atomic Force Acoustic Microscopy (AFAM) and MFM. However, in C-AFM methods that utilize contact resonance for signal amplification, the resonance frequency is primarily determined by the local tip-sample contact stiffness. Relying on the contact stiffness represents a major limitation of current contact-mode functional AFM techniques, because the contact stiffness varies due to topographic and material variations of the sample, consequently causing the resonant frequency to vary as well. Therefore, there can be significant crosstalk between sample topography and the functional response to the harmonic excitation, leading to undesirable artifacts and complicated interpretations of the functional properties. Moreover, in the absence of an invariant resonant frequency, calibration of the tip geometry and/or the force-sensor configuration can be extremely difficult, making quantitative measurements in AFM challenging to perform.

In order to overcome the limitations of the aforementioned techniques, recent efforts have been devoted to developing methods to track changes in the contact resonant frequencies of the cantilever as it scans over the surface. Resonant frequency tracking can be accomplished by adjusting the excitation frequency via a Phase Locked Loop (PLL). While PLLs have proven to be effective in techniques like NC-AFM and C-AFM (such as AFAM), they cannot be reliably used in cases where the relationship between the phase of the excitation and the driving signals strongly depends on local material properties. In other work, a Dual Frequency Resonance Tracking (DFRT) technique tracks the resonant frequency by measuring the amplitudes at two frequencies near resonance. In other work, a Band Excitation (BE) method excites and detects responses at all frequencies within a specified frequency range in the vicinity of the resonance. The commonality between DFRT and BE methods is that both techniques involve the excitation and detection of multiple frequencies to track changes in the contact resonant frequency, allowing the cantilever to be operated near resonance where PLLs are not possible. However, the main drawback of these methods is that they require additional data and signal processing, especially in the case of highly heterogeneous samples where BE requires a broader range of frequency inputs, whereas DFRT may fail to track any large scale resonant frequency changes.

What is needed, therefore, is a cantilever that provides a stable, i.e. invariant, contact resonant frequency, independent of changes in the local contact stiffness.

SUMMARY OF THE INVENTION

In one embodiment of the invention, a cantilever system for use in an atomic force microscope (AFM) includes a base cantilever portion having a first end and a second end. The first end has a protruding tip and the second end is adapted to support the base cantilever portion when the second end is mounted to an AFM. The cantilever system further includes a paddle having a first end and a second end. The first end of the paddle is connected to the base cantilever portion and the second end of the paddle is free to move relative to the base cantilever portion. The base cantilever portion has an effective bending stiffness, $k_1$, and the paddle has an effective bending stiffness, $k_2$. The ratio of the effective bending stiffness, $k_1$, to the effective bending stiffness, $k_2$, is at least 4. In one embodiment, the ratio of the effective bending stiffness, $k_1$, to the effective bending stiffness, $k_2$, is at least equal to or greater than 10. In another embodiment, the base cantilever portion has a thickness, $t_c$, and the paddle has a thickness, $t_p$. The thickness $t_p$ is no greater than one half of $t_c$. In another embodiment, the thickness $t_p$ is no greater than one third of $t_c$.

In one embodiment of the invention, a device for sensing a force includes a surface and a cantilever, where the cantilever includes a base cantilever portion with a first end and a second end. The first end has a protruding tip and the second end supports the base cantilever portion. The cantilever further includes a paddle with a first end and a second end. The first end of the paddle is connected to the base cantilever portion and the second end of the paddle being free to move relative to the base cantilever portion. The device further includes a force generator configured for providing a force between the tip and the surface and a detector configured for sensing a deflection of the cantilever in response to the force. The base cantilever portion has an effective bending stiffness, $k_1$, and the paddle has an effective bending stiffness, $k_2$. The ratio of the effective bending stiffness, $k_1$, to the effective bending stiffness, $k_2$, is at least 4. In one embodiment, the effective bending stiffness, $k_1$, to the effective bending stiffness, $k_2$, is at least equal to or greater than 10. In one embodiment, the base cantilever portion has a thickness, $t_c$, and the paddle has a thickness, $t_p$, wherein the thickness $t_p$ is no greater than one half of $t_c$. In one embodiment, the thickness $t_p$ is no greater than one third of $t_c$.

In one further embodiment, a cantilever system for use in an atomic force microscope (AFM) includes a V-shaped base cantilever portion having a first end and a second end. The first end has a protruding tip and the second end is adapted to support the base cantilever portion when the second end is mounted to an AFM. The cantilever system further includes a paddle including a tab portion and a trapezoid-shaped portion. The paddle has a first end associated with the tab portion and a second end associated with the trapezoid-shaped portion. The first end of the paddle is connected to the base cantilever portion and the second end of the paddle being free to move relative to the base cantilever portion. The base cantilever portion has an effective bending stiffness, $k_1$, and the paddle has an effective bending stiffness, $k_2$. The ratio of the effective bending stiffness, $k_1$, to the effective bending stiffness, $k_2$, is at least 4. In one embodiment, the ratio of the effective bending stiffness, $k_1$, to the effective bending stiffness, $k_2$, is at least equal to or greater than 10. In another embodiment, the base cantilever portion has a thickness, $t_c$, and the paddle has a thickness, $t_p$, and the thickness $t_p$ is smaller than the thickness, $t_c$.

BRIEF DESCRIPTION OF THE DRAWINGS

The accompanying drawings, which are incorporated in and constitute a part of this specification, illustrate embodiments of the invention and, together with the detailed description of the embodiments given below, serve to explain the principles of the invention.

FIGS. 5A and 5C are deflection, PFM amplitude, and PFM phase images of collagen fibrils and FIGS. 5B and 5D are frequency response curves using different cantilever designs.

DETAILED DESCRIPTION OF THE INVENTION

Figure 1:
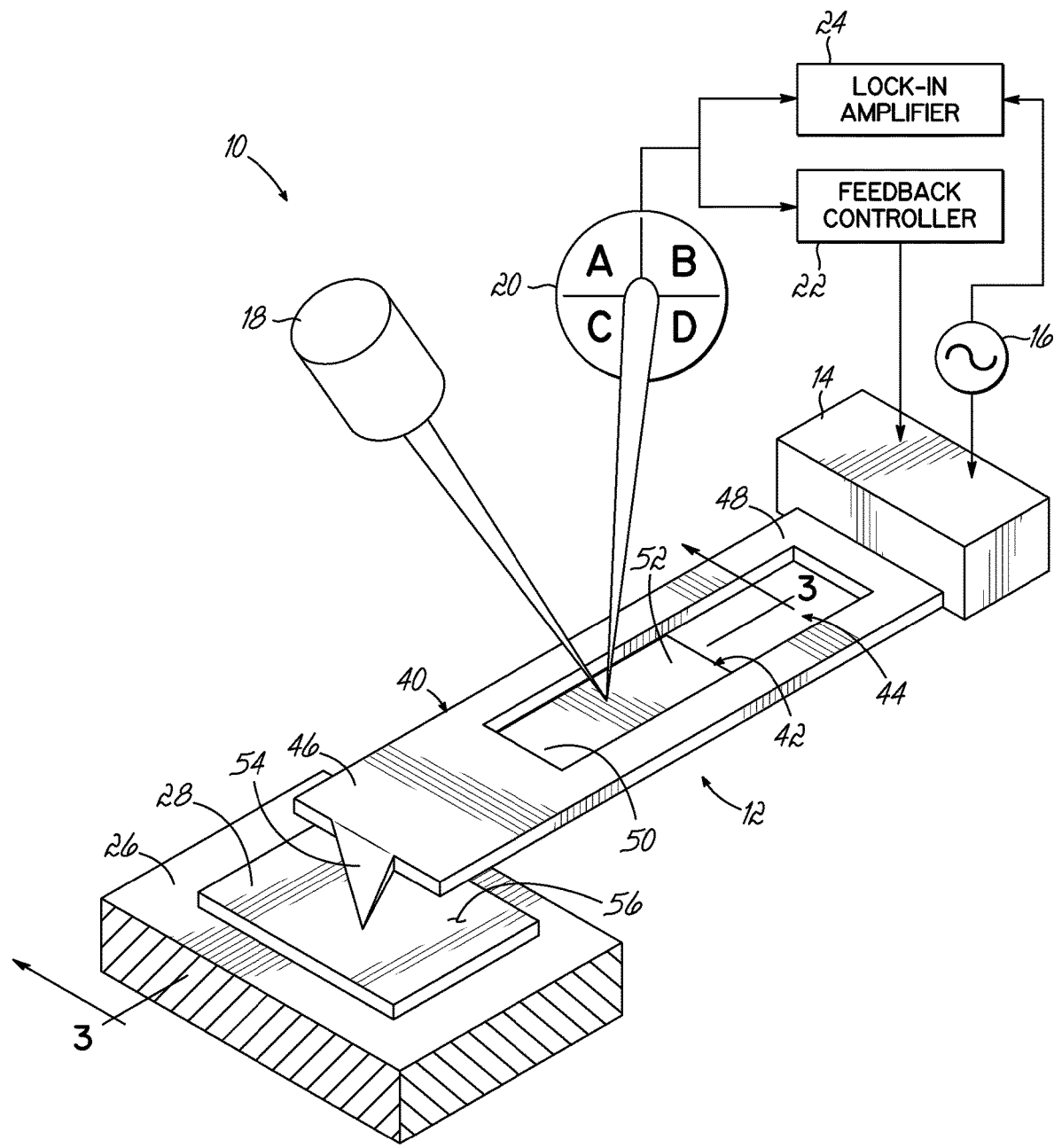
FIG. 1 is a schematic representation of an atomic force microscope system incorporating a cantilever system according to one embodiment of the invention.

FIG. 1 is a schematic representation of an AFM system 10 incorporating one embodiment of a cantilever system 12 constructed in accordance with the invention. The cantilever system 12 is held by a holder 14. An electrical input may be applied to the holder 14 and thus the cantilever system 12 and a sample 28 via a generator such as an A/C source 16. The AFM system 10 further includes a laser 18, a 4-quadrant photo-detector 20, a feedback controller 22, a lock-in amplifier 24, and an XY stage 26 where a sample 28 can be placed.

Figure 2:
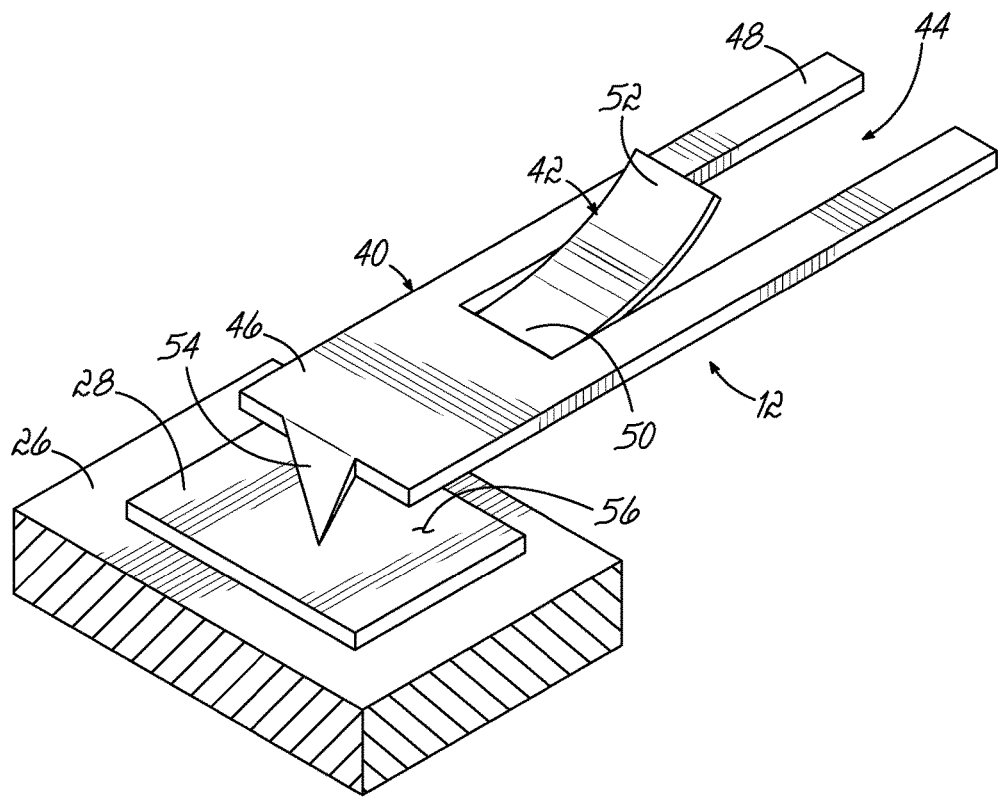
FIG. 2 is a perspective view of the cantilever system shown in FIG. 1 with the inner paddle deflected upwards.

The invention optimizes the design of the cantilever system 12. Unlike the unibody design of a conventional micro-cantilever, the cantilever system 12 of the invention includes a base cantilever portion 40 and an inner paddle 42 in the form of a silicon nano-membrane integrated within a middle cavity 44 of the base cantilever portion 40. The design of the cantilever system 12 allows for the free oscillation of the inner paddle 42 over the middle cavity 44 during C-AFM operation. The base cantilever portion 40 has a first end 46 and a second end 48. The second end 48 supports the base cantilever portion 40 when the second end 48 is held by holder 14. The inner paddle 42 has a first end 50 and a second end 52. The first end 50 of the inner paddle 42 is connected to the base cantilever portion 40 and the second end 52 of the inner paddle 42 is free to move relative to the base cantilever portion 40. A tip 54 protrudes from the first end 46 of the base cantilever portion 40. As shown in FIG. 2, the tip 54 is designed to contact an upper surface 56 of the sample 28. Because the inner paddle 42 is not in physical contact with upper surface 56, the design of the cantilever system 12 minimizes the effect of local contact stiffness on the resonance frequency of the inner paddle 42, while still coupling the dimensional changes of the sample 28 to its dynamics. Thus, the cantilever system 12 provides a stable (invariant) contact resonant frequency, independent of the changes in the local contact stiffness, which is the basis of ultimate decoupling between topographic changes and functional response.

Figure 3:
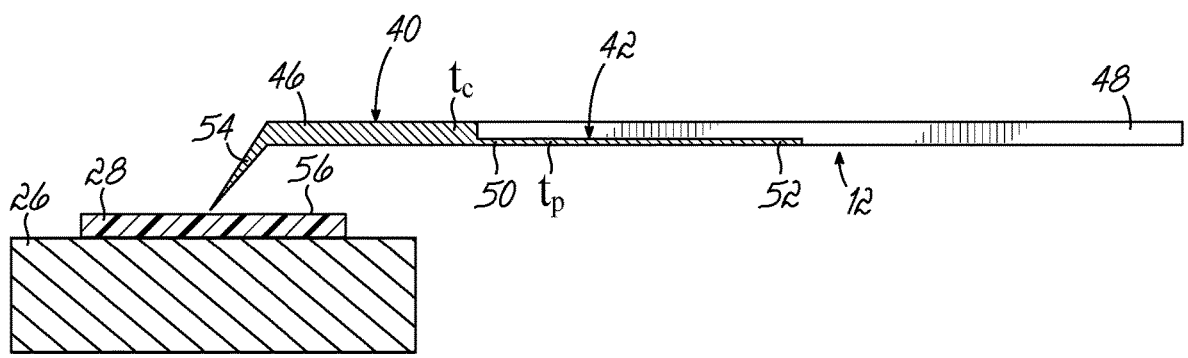
FIG. 3 is a cross-sectional view of the cantilever system shown in FIG. 1 taken along line 3-3.

In one embodiment, the base cantilever portion 40 has an effective bending stiffness ($k_1$) relative to vertical deflections of the first end 46 of the base cantilever portion 40. Similarly, inner paddle 42 has an effective bending stiffness ($k_2$) relative to vertical deflections of the second end 52 of inner paddle 42. The effective bending stiffness for a beam with a rectangular cross-section is a function of all dimensions (length, width, and length) and proportional to the (width)×(thickness)^3/(length)^3. The ratio of $k_1$ to $k_2$ is at least greater than 4, and preferably at least equal to or greater than 10. To achieve this ratio, the dimensions of inner paddle 42, i.e., length, width, and thickness, may be controlled to achieve its reduced effective bending stiffness and enable the free motion of inner paddle 42 while the base cantilever portion 40 is not deflected. In one embodiment, the thickness $t_p$ of inner paddle 42 is reduced accordingly compared to the thickness $t_c$ of the base cantilever portion 40 as illustrated in FIG. 3. In one example, the $t_p$ may be no greater than one half of $t_c$ and preferably no greater than one third of $t_c$.

The bending stiffness $k_2$ of inner paddle 42 could also be reduced relative to the bending stiffness $k_1$ of the base cantilever portion 40 by reducing the width of inner paddle 42. Alternatively, inner paddle 42 could be made from a different material from the base cantilever portion 40, such that the modulus of elasticity of inner paddle 42 is less than the modulus of elasticity of the base cantilever portion such that the ratio of $k_1$ to $k_2$ is at least greater than 10.

Figure 4A:
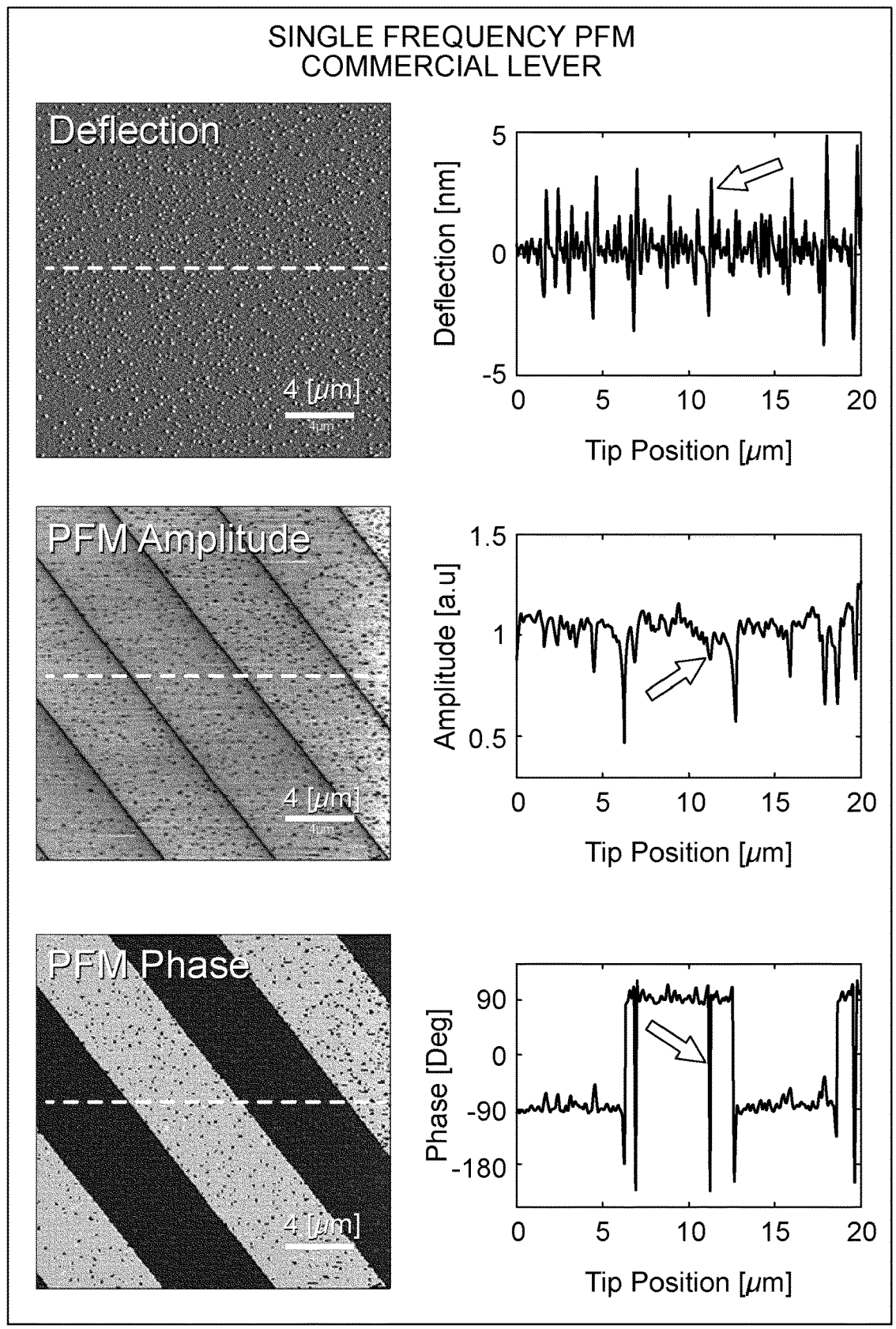
FIGS. 4A-4C are deflection, PFM amplitude, and PFM phase images of a periodically poled Lithium Niobate (PPLN) sample using different cantilever designs.
Figure 4B:
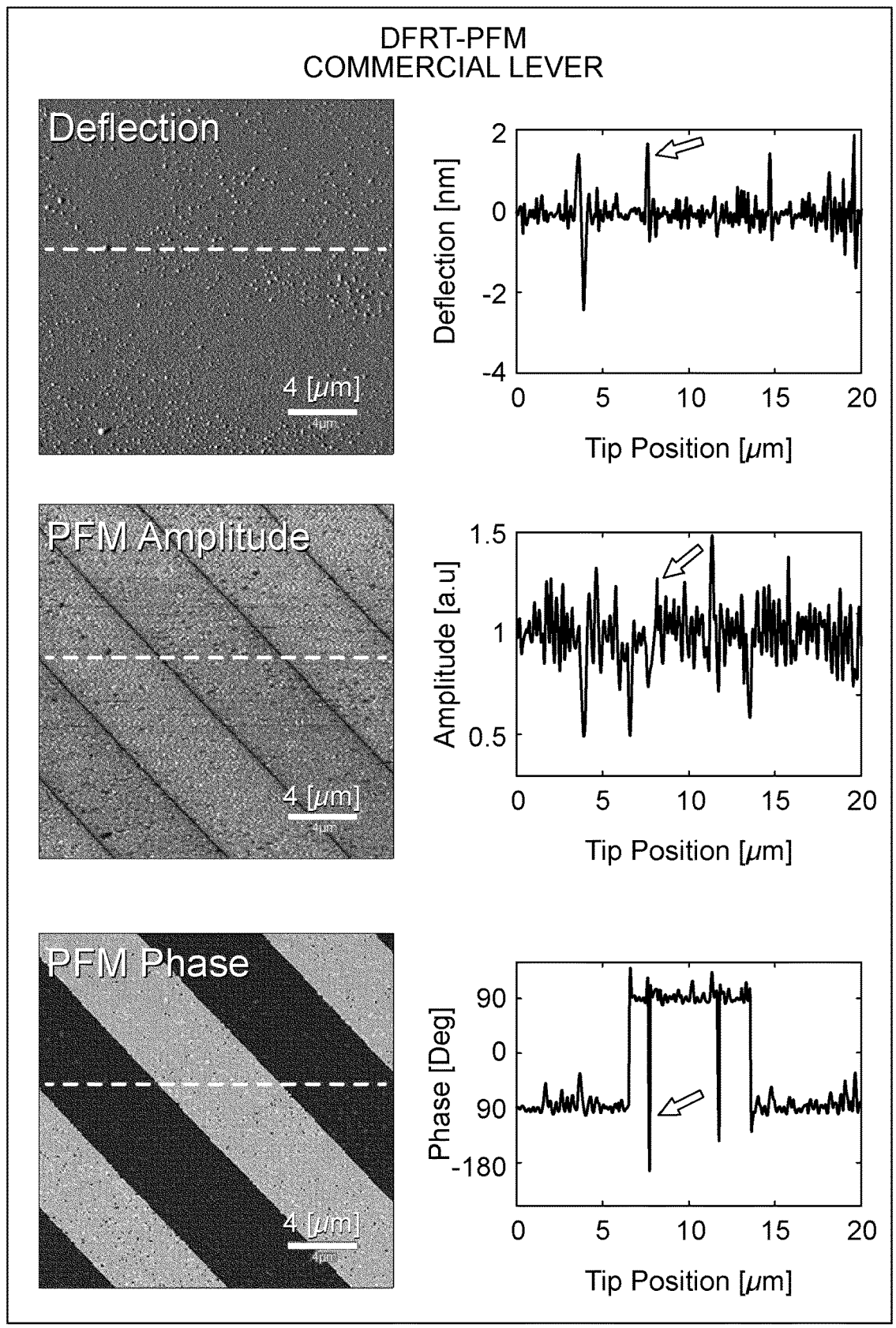
Figure 4C:
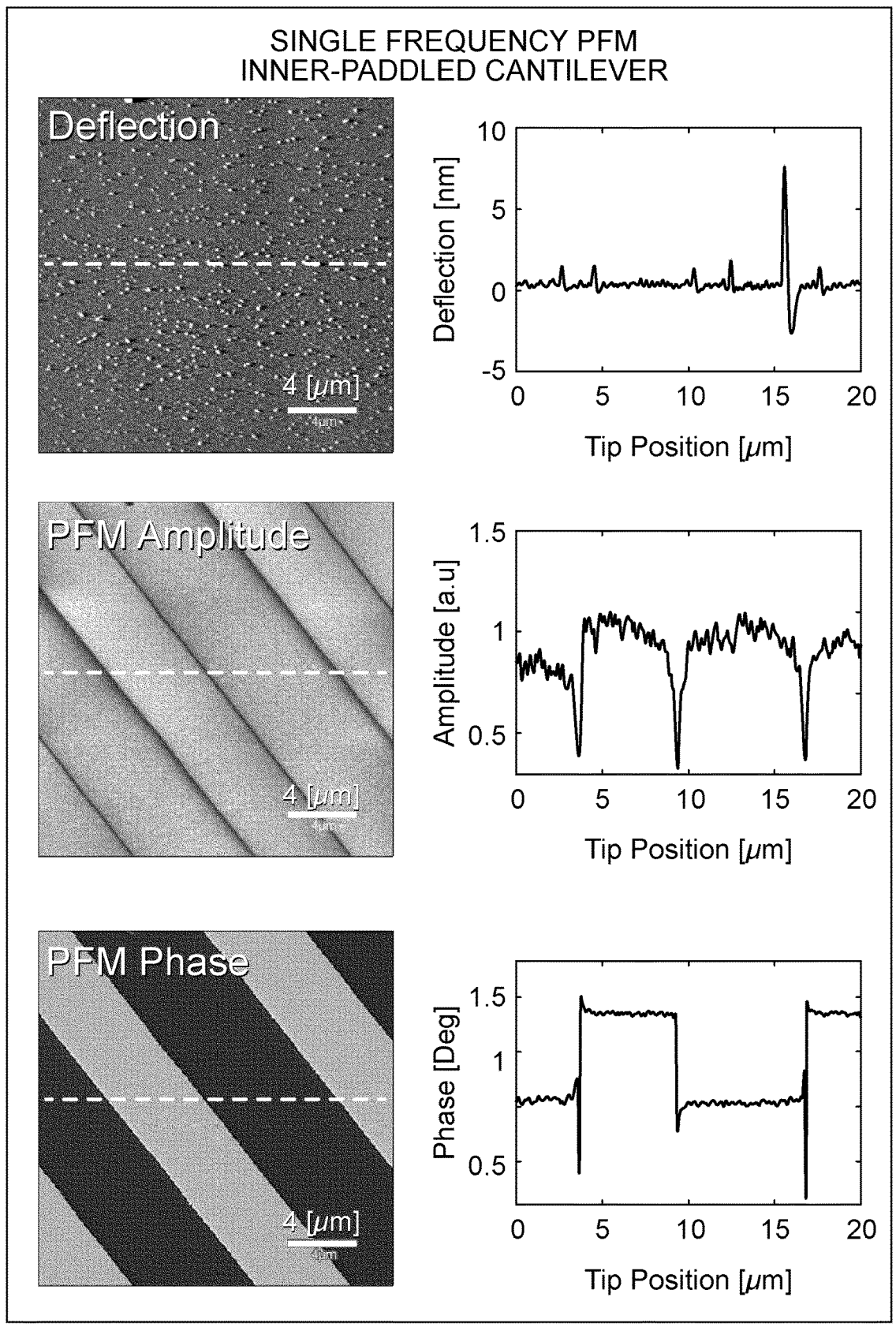

To test the design of the cantilever system 12, a cantilever system with an inner paddle was fabricated where the thickness of the base cantilever portion was 1.6 μm and the thickness of the inner paddle was 300 nm. That fabricated cantilever system and a commercial (unibody) cantilever were then used to perform PFM measurements on the same samples. FIGS. 4A-C illustrates PFM imaging of periodically poled Lithium Niobate (PPLN, Model 900.241 by Asylum Research). We intentionally measured a contaminated sample to produce the topological variations on the flat PPLN sample. FIGS. 4A and 4B depict the results obtained using a commercial cantilever (MikroMasch NSC18/Pt) in single-frequency PFM and DFRT-PFM, respectively, while FIG. 4C depicts the result obtained using an inner-paddled cantilever in single-frequency PFM. The deflection images depicted in FIGS. 4A-C clearly show variations in the topography (~2-5 nm), presumably due to non-piezoelectric surface contaminations. The crosstalk associated with contact resonant frequency variations are typically caused by variations in the tip-sample contact stiffness due to changes in the topography or material. This topographic-material crosstalk, often encountered in PFM when operating near resonance, is also illustrated in the PFM amplitude and phase images depicted in FIGS. 4A-B, where the artifacts observed are consistent with the topographic variations in the corresponding deflection images as indicated by the arrows in the line scans.

Even though DFRT-PFM was shown to be effective in eliminating crosstalk between changes in the contact stiffness and the PFM signal when imaging fairly flat and homogenous samples where frequency shifts of up to 5 kHz were observed, it is evident from this result that any large-scale variations in the topography could cause instabilities. In contrast, no artifacts are observed in the PFM amplitude and phase images obtained by the inner-paddled cantilever system, even though the same-level of variations in the topography are seen here as well. This experimentally verifies that the design of the cantilever system 12 is capable of ultimately decoupling the topographic information from the functional material responses.

The performance enhancement of the inner-paddled cantilever system is further demonstrated in PFM imaging of collagen (Sigma Aldrich SLBG4268V) on a glass substrate as illustrated in FIGS. 5A-D. Unlike solid-state samples, PFM of bio-materials is more challenging because they are by nature heterogeneous in terms of topography and material and display weak piezoelectricity. FIGS. 5A-B depict results obtained using a conventional cantilever (MikroMasch XSC11/Pt, cantilever A) and FIGS. 5C-D depict results obtained using the inner-paddled cantilever system, on the collagen sample. The mapping results in FIGS. 5A and 5C show the characteristic periodicity of collagen fibrils with very high spatial resolution in their respective deflection, PFM amplitude, and phase images. The corresponding frequency response curves in FIGS. 5B and 5D show the contact resonance obtained on regions of the collagen fibrils (marked as A, B) and the glass substrate (marked as C) while the frequency of the voltage applied to the tip was swept. The contact resonance curves of a conventional cantilever in FIG. 5B show strong variations of the contact resonant frequency depending on the changes in topographic and material stiffness features.

In comparison, the contact resonance of an inner-paddled cantilever system in FIG. 5D shows no variations in the resonant frequency with respect to topographical changes, again demonstrating the reproducibility of the invariant contact resonant frequency on different surfaces. In these contact resonance curves, large resonance amplitudes were obtained not only on the piezoelectric collagen but also on the non-piezoelectric glass substrate, indicating that the measured response is primarily because of the electrostatic forces between the surface and the conductive tip, rather than the intrinsic electromechanical response of collagen itself. The low voltage used to obtain these results ($V_{ac}$=4V) cannot induce a strong electromechanical response in weakly piezoelectric materials such as collagen. When combined with amplitude changes caused by the shift in the contact resonant frequency, this electrostatic effect causes artifacts in PFM results.

The expected complications associated with probing weakly piezoelectric bio-samples is immediately apparent in the PFM amplitude image obtained using the conventional cantilever illustrated in FIG. 5A; the non-piezoelectric glass surface shows a higher PFM amplitude than the collagen fibrils and the collagen fibrils A and B exhibit a significant difference in their piezoelectric amplitudes. The frequency response curves in FIG. 5B reveal that this artifact is because of the strong electrostatic force and variations in the contact resonance frequency. Besides, the arrow indicates a sudden change in contrast in the PFM amplitude and phase images in FIG. 5A. This change in contrast indicates a jump in the contact resonance most likely caused by the cantilever tip picking up a contaminant, resulting in an irreversible change in the contact resonance frequency and, accordingly, PFM responses. In comparison, the PFM images obtained by an inner-paddled cantilever system in FIG. 5C show larger PFM amplitudes on all collagen fibrils compared with those of the glass substrate, which is consistent with expectations for this sample. In spite of the strong interference from the electrostatic forces, the inset of FIG. 5D illustrates a clear difference in the amplitudes of the frequency response curves obtained over the collagen fibrils (regions A and B) and the surrounding area (region C). This difference in the amplitudes is an indication of the piezoelectric strain of collagen. In fact, the invariant contact resonance enabled by the design of the cantilever system 12 allows for qualitatively characterizing minute changes in the response even in the presence of the strong effect of electrostatics. This result further emphasizes the efficacy of the design of the cantilever system 12 in that it ultimately decouples the topological and functional information for functional imaging of not only solid-state samples but also of highly heterogeneous bio-samples.

In many areas of functional AFM, quantitative measurements are believed to be very challenging, largely due to extreme sensitivity to imaging conditions, therefore requiring extensive calibration of the probe geometry and/or force-sensor configuration to relate the material functional response and cantilever deflection. Even with careful calibration, in most cases the changes in the resonant frequency makes it impossible to perform accurate quantitative measurements.

Figure 6A:
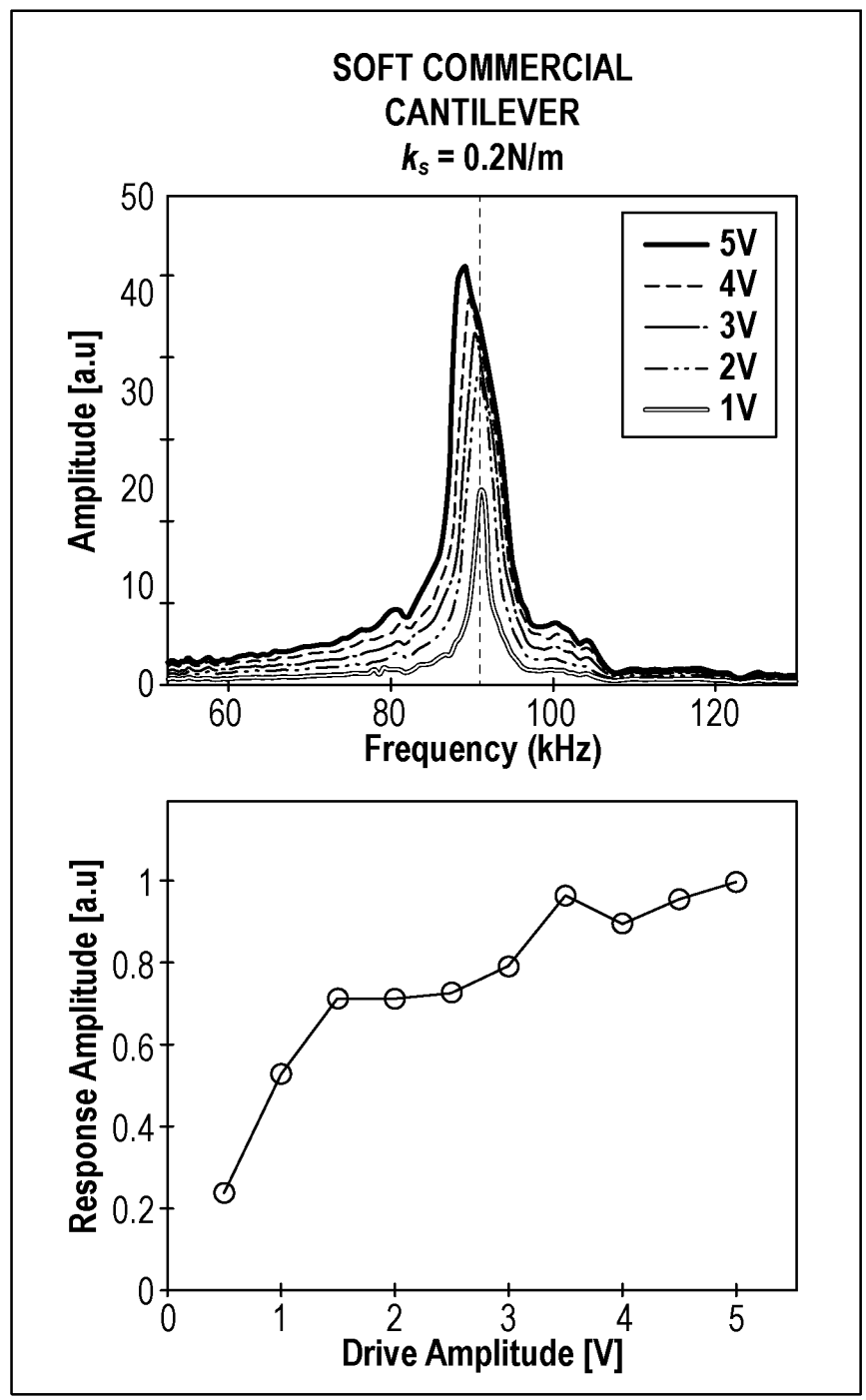
FIGS. 6A-6C are comparison of resonance curves of different cantilever designs.
Figure 6B:
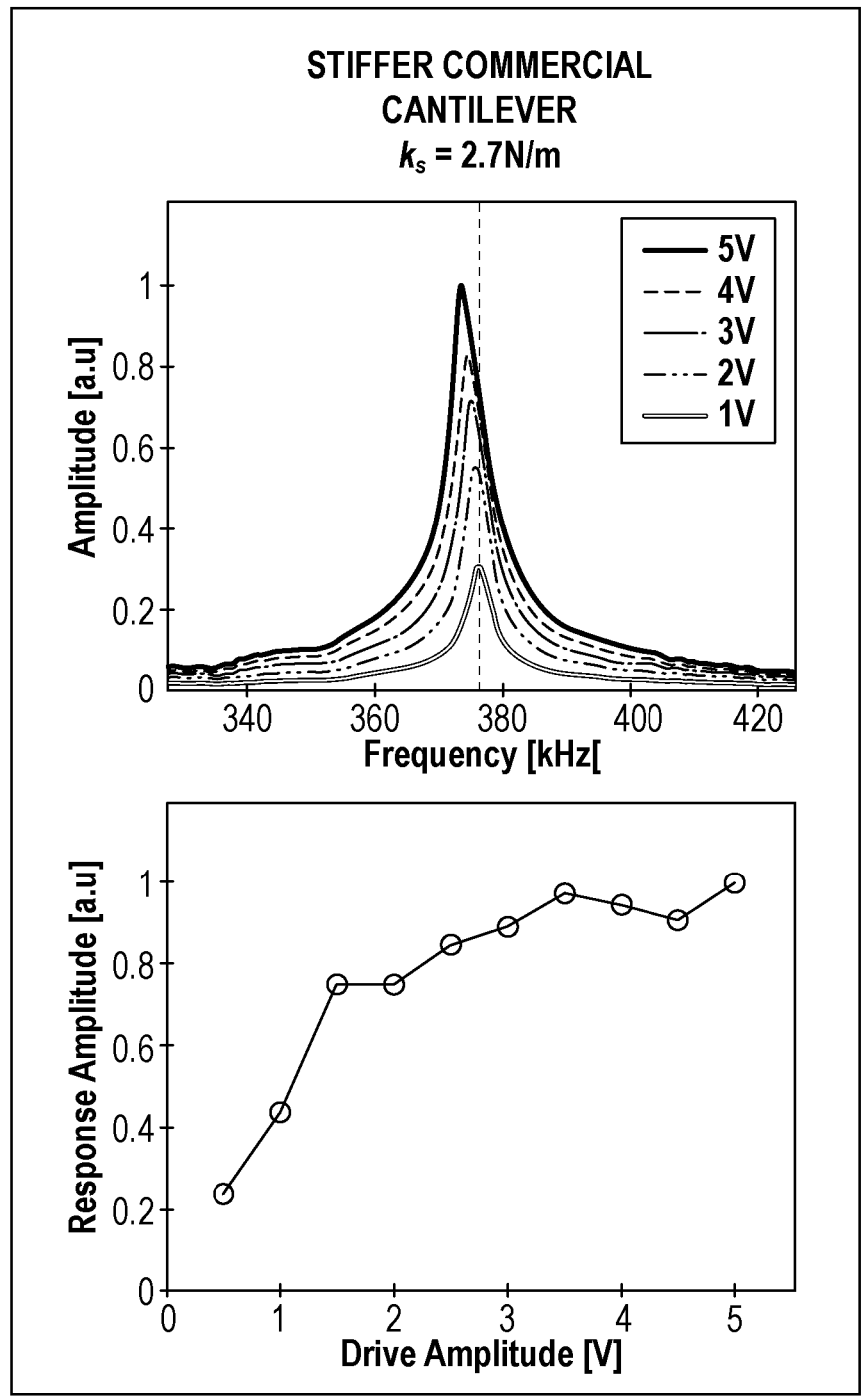

As a demonstration, the stability and linearity of the contact resonance peaks of a conventional cantilever were experimentally investigated while varying the magnitude of the excitation force. FIGS. 6A-B depict the responses of two commercial cantilevers, MikroMasch XSC11/Pt cantilevers A (nominal k=0.2 N/m) and B (nominal k=2.7 N/m), respectively. The resonance curves were measured as the applied AC voltage was varied from 0.5V to 5V while the cantilever tip was held in contact with PPLN. Then, to determine the relationship between the excitation strength and cantilever response, the response amplitudes of the resonant curves were obtained at a certain fixed frequency as a function of the excitation level. Referring to FIGS. 6A-B, the resonance peaks of the two conventional cantilevers illustrated here appear to shift to lower frequencies as the drive amplitude is increased. Furthermore, the measured response amplitudes at a fixed frequency exhibit nonlinear behavior with respect to the drive amplitude. Both these observations demonstrate the variations of the resonant peaks and the unpredictability of the cantilever response, making quantitative measurements fundamentally impossible to perform.

Figure 6C:
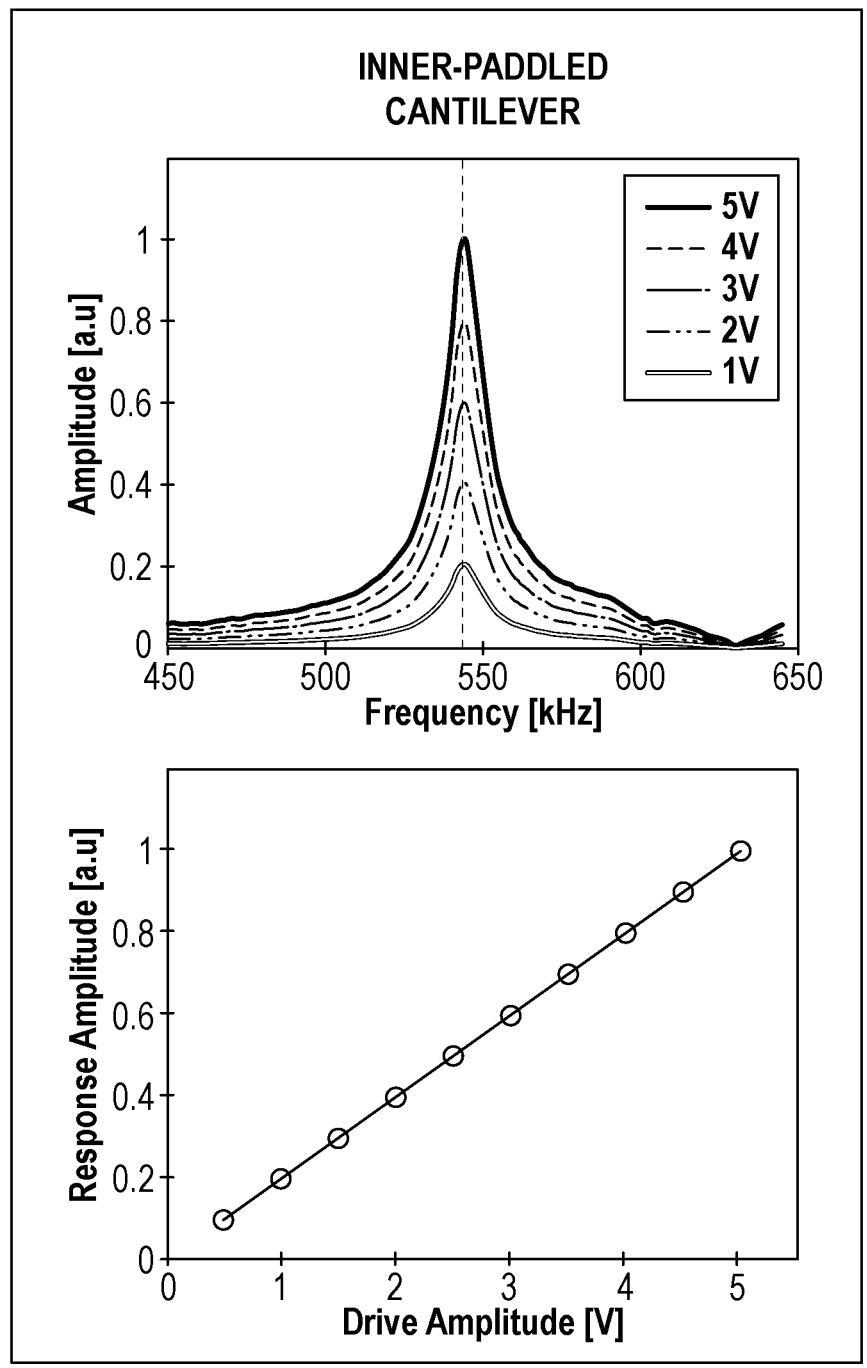

The experiment was repeated with an inner-paddled cantilever according to the invention to compare its results with that of the commercial cantilevers. FIG. 6C depicts the measured response of an inner-paddled cantilever. As expected, the inner-paddled cantilever exhibits an invariant resonant frequency when the input is varied and, more importantly, the resulting amplitude varies linearly with respect to the drive voltage. The linearity observed by the stable contact resonance for the design of the cantilever system 12 can enhance the reliability and accuracy of quantitative measurements of PFM which, as mentioned previously, still represents a significant challenge when utilizing the contact resonance of a conventional cantilever as an amplifier.

An analytical approach was also employed to complement the PFM scanning results presented above to provide a detailed dynamic analysis of the proposed inner-paddled cantilever system. Based on the dynamic structure of the design of the cantilever system 12, a two-degree-of-freedom (two-DOF) reduced order model (ROM) was constructed in the form of a discrete spring-mass system as shown in FIG. 7C. This model is based on the assumption that the base cantilever portion and the inner paddle oscillate in their own fundamental, linearized bending modes while being linearly coupled to each other. In the ROM the subscripts 1 and 2 denote the base cantilever portion and the inner paddle, respectively. The base cantilever portion is modeled as a spring-damper system with effective mass $m_1$, effective spring constant $k_1$, and effective damping coefficient $c_1$. The mass of the base cantilever portion ($m_1$) interacts with the sample surface while the tip scans over the sample during contact mode operation. The tip-sample interaction is modeled as a spring-damper system ($k_s$, $c_s$). The inner paddle is modeled as a second spring-mass-damper system ($k_2$, $m_2$, $c_2$), linearly coupled to the base cantilever portion. Based on this ROM the equations of motion are given by $$m_1\ddot{x}_1+c_1\dot{x}_1+k_1x_1+k_2(x_1-x_2)+c_2(\dot{x}_1-\dot{x}_2)+k_sx_1+c_sx_1=k_su+c_s\dot{u}m_2\ddot{x}_2+k_2(x_2-x_1)+c_2(\dot{x}_2-\dot{x}_1)=0 \quad (1)$$

The functional response of a sample to a certain applied stimulus is modeled as an input displacement (u) to the cantilever system. Since the inner paddle is not in physical contact with the sample surface, the tip sample-interaction is assumed to be applied to mass $m_1$. For instance, in PFM, u is the piezoelectric strain of the sample caused by a modulation sinusoidal voltage applied to the sample surface via a conductive tip; in AFM-IR, u is the photothermal expansion on the sample caused by a pulsed IR laser source incident to it.

Figure 7A:
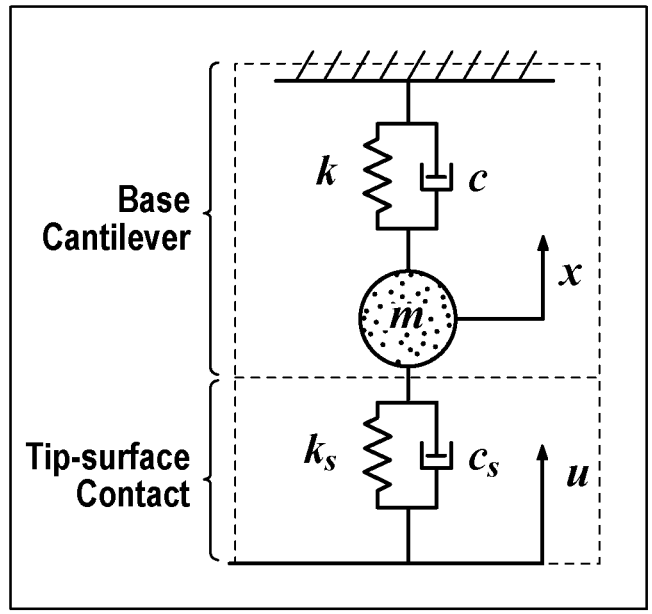
FIG. 7A is a schematic representation of a lumped parameter model of a typical commercial AFM cantilever in the form of a single damped harmonic oscillator.

The addition of the inner-paddle gives the cantilever system an additional degree of freedom (as opposed to a single degree of freedom representing the fundamental mode of the conventional cantilever as shown in the corresponding ROM of FIG. 7A), thus providing an additional resonant frequency which can be exploited for contact resonance enhanced functional imaging techniques. Performing a modal analysis of the ROM shown in FIG. 7C yields the expression for the two modal frequencies ($\omega_1$ and $\omega_2$) of the integrated cantilever system, $$\omega_1 = \sqrt{\frac{k_1 m_2 + k_2 m_1 + k_2 m_2 + k_s m_2 - \alpha}{2 m_1 m_2}} \quad (2)$$

$$\omega_2 = \sqrt{\frac{k_1 m_2 + k_2 m_1 + k_2 m_2 + k_s m_2 + \alpha}{2 m_1 m_2}}$$

where $$\alpha = \sqrt{\begin{array}{l}(k_1 m_2)^2 - 2k_1 k_2 m_1 m_2 + 2k_1 k_2 m_2^2 + 2k_1 k_s m_2^2 + (k_2 m_1)^2 + \\ 2k_2^2 m_1 m_2 + (k_2 m_2)^2 - 2k_2 k_s m_1 m_2 + 2k_2 k_s m_2^2 + (k_s m_2)^2\end{array}}$$

Figure 7B:
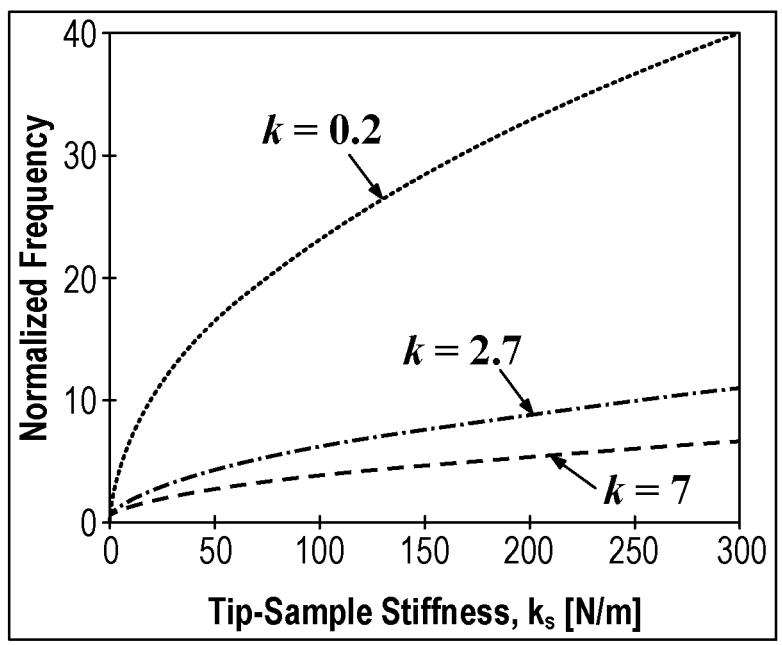
FIG. 7B illustrates variations in the fundamental mode frequency of the lumped parameter model of FIG. 7A with respect to the tip-sample contact stiffness for three different cantilever stiffnesses.
Figure 7C:
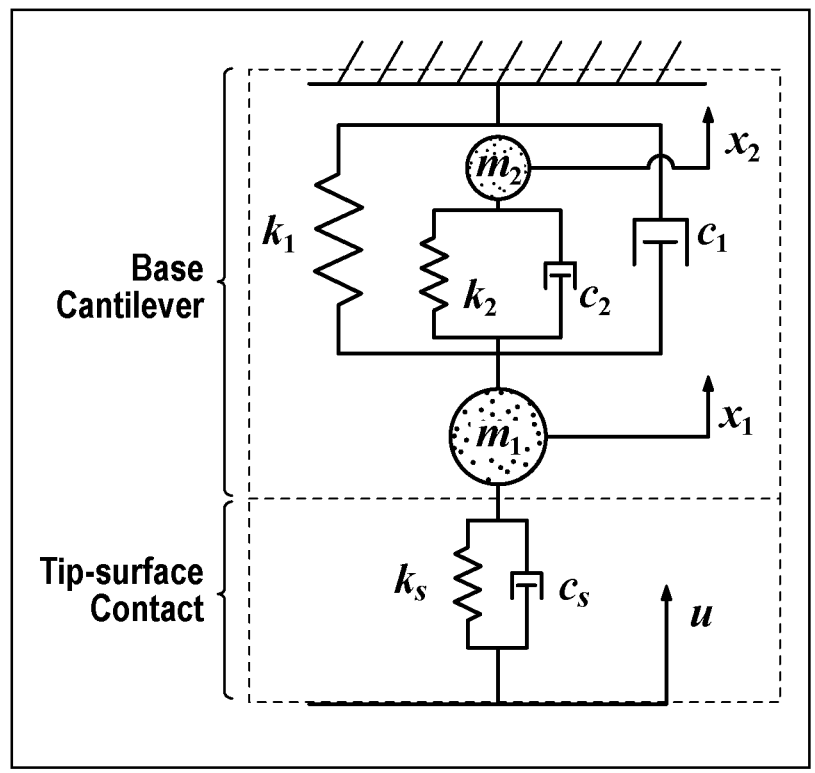
FIG. 7C is a schematic representation of a two-degree-of-freedom reduced order model of the inner paddle-base cantilever system.
Figure 7D:
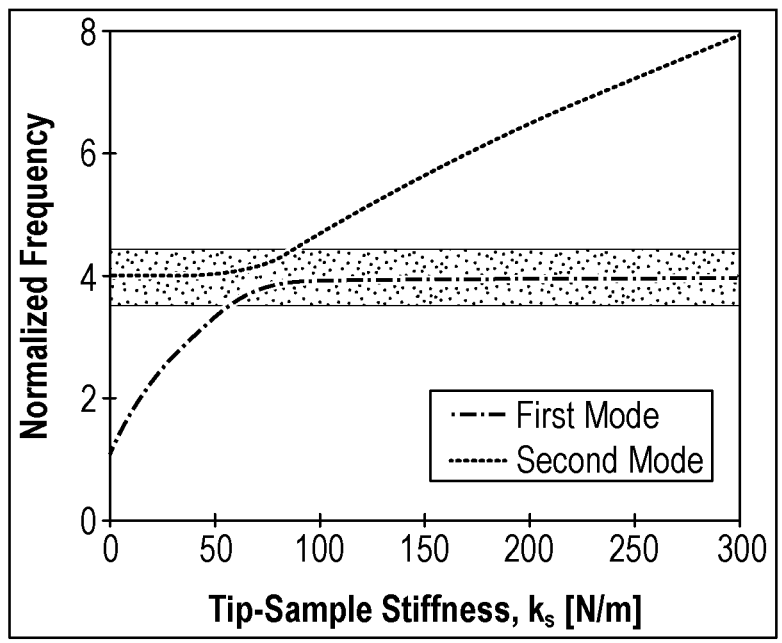
FIG. 7D illustrates variations of the first and second mode frequencies of the cantilever system of FIG. 7C with respect to the tip-sample contact stiffness.

These modal frequencies represent the two leading natural frequencies of the cantilever system. Equation (2) serves as a convenient tool for investigating the effect of contact conditions on the modal frequencies of the system since both frequencies are functions of the tip-surface contact stiffness ($k_s$). The variations in the modal frequencies with respect to the contact stiffness for an inner-paddled cantilever are shown in FIG. 7D. Here, the frequencies are normalized by the first modal frequency of the free oscillation ($k_s=0$) of each cantilever to facilitate comparison. The parameters of the inner-paddled cantilever used in the calculation of the modal frequencies are as follows:

$m_1$=6.278 ng, $m_2$=0.0533 ng, $k_1$=4.9444 N/m, $k_2$=0.6598 N/m.

It is important to note that the appreciable differences in the parameters between the base cantilever portion and inner paddle ($m_1$ vs. $m_2$, $k_1$ vs. $k_2$) allow the cantilever system to be modeled with two-DOF under the assumption that the inner paddle and the base cantilever portion vibrate in their own fundamental bending modes and the two resonance regions of the base cantilever and the inner paddle are well separated. Referring to FIG. 7D, for lower values of $k_s$, an increase in the stiffness of the tip-surface contact results in an increase in the first modal frequency, whereas the second modal frequency appears to remain unchanged. Yet, for higher values of $k_s$ the reverse happens, with the first modal frequency remaining unchanged while the second modal frequency increasing as the contact stiffness is increased further. Furthermore, the first modal frequency saturates at a frequency that matches the second modal frequency when $k_s=0$ (i.e., when there is no contact between the cantilever tip and sample surface). To summarize, the first contact resonance frequency of this paddle-cantilever system does not appear to vary with respect to the tip-sample stiffness as long as the contact stiffness is greater than a critical value. This result provides theoretical support to the experimental observations of FIGS. 4C and 5C-D and further confirms that an invariant contact resonant frequency is attainable by the inner-paddle that is not in physical contact with the sample surface.

For comparison with the inner-paddled cantilever design, the conventional cantilever with tip in contact with the sample is modeled as shown in FIG. 7A; the cantilever is modeled as a single damped harmonic oscillator (m, k, c) while the tip-sample interaction is again modeled by a spring-damper system ($k_s$, $c_s$). In this model, the effective stiffness of the system is simply $k+k_s$. Hence, the fundamental frequency is calculated as $\sqrt{(k_s+k)/m}$, which continuously increases with respect to the tip-sample stiffness ($k_s$) as shown in FIG. 7B. This analysis demonstrates the strong dependence of the contact resonant frequency on the local mechanical contact conditions, which aligns with the observations of FIGS. 4A-B and 5A-B.

Figure 8A:
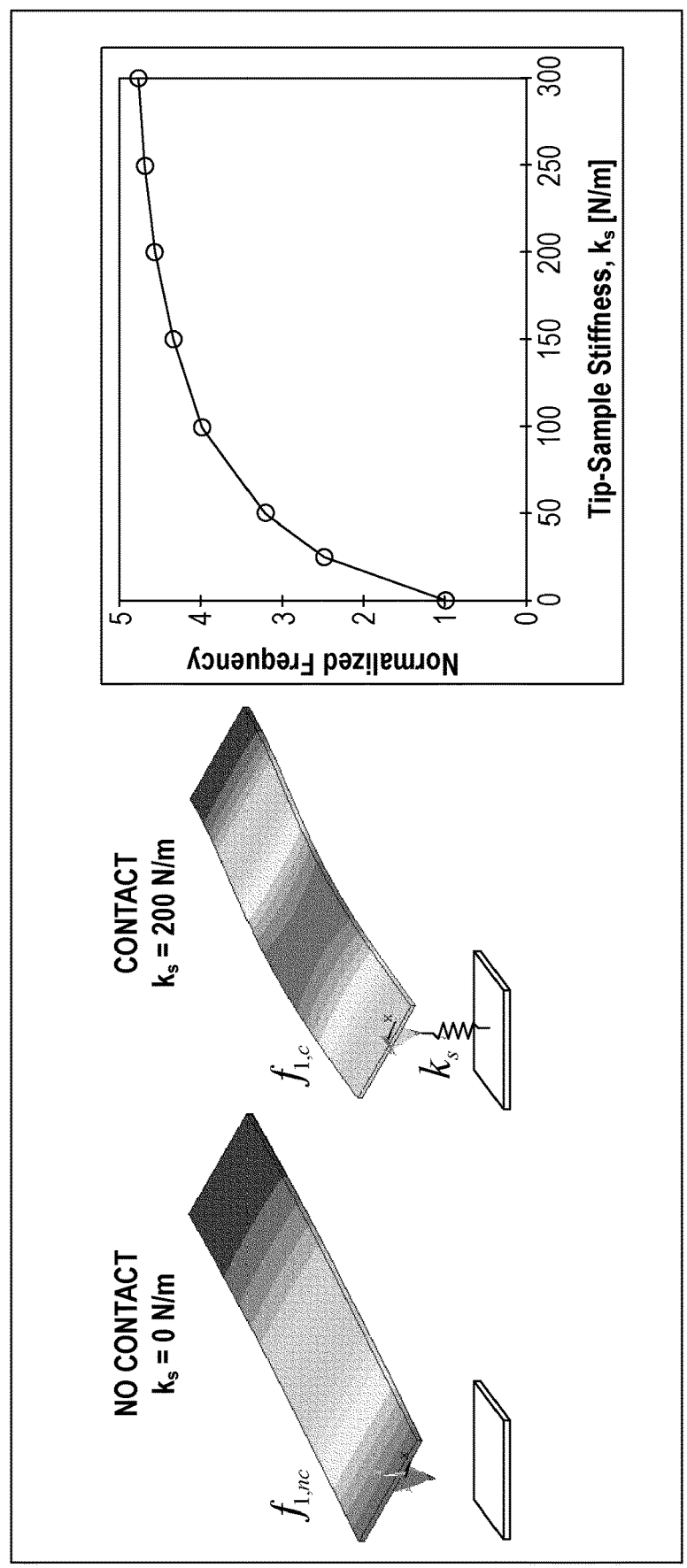
FIG. 8A illustrates finite element analysis simulations of the mode shapes and modal frequencies with respect to the tip-sample contact stiffness ($k_s$) of a unibody cantilever.
Figure 8B:
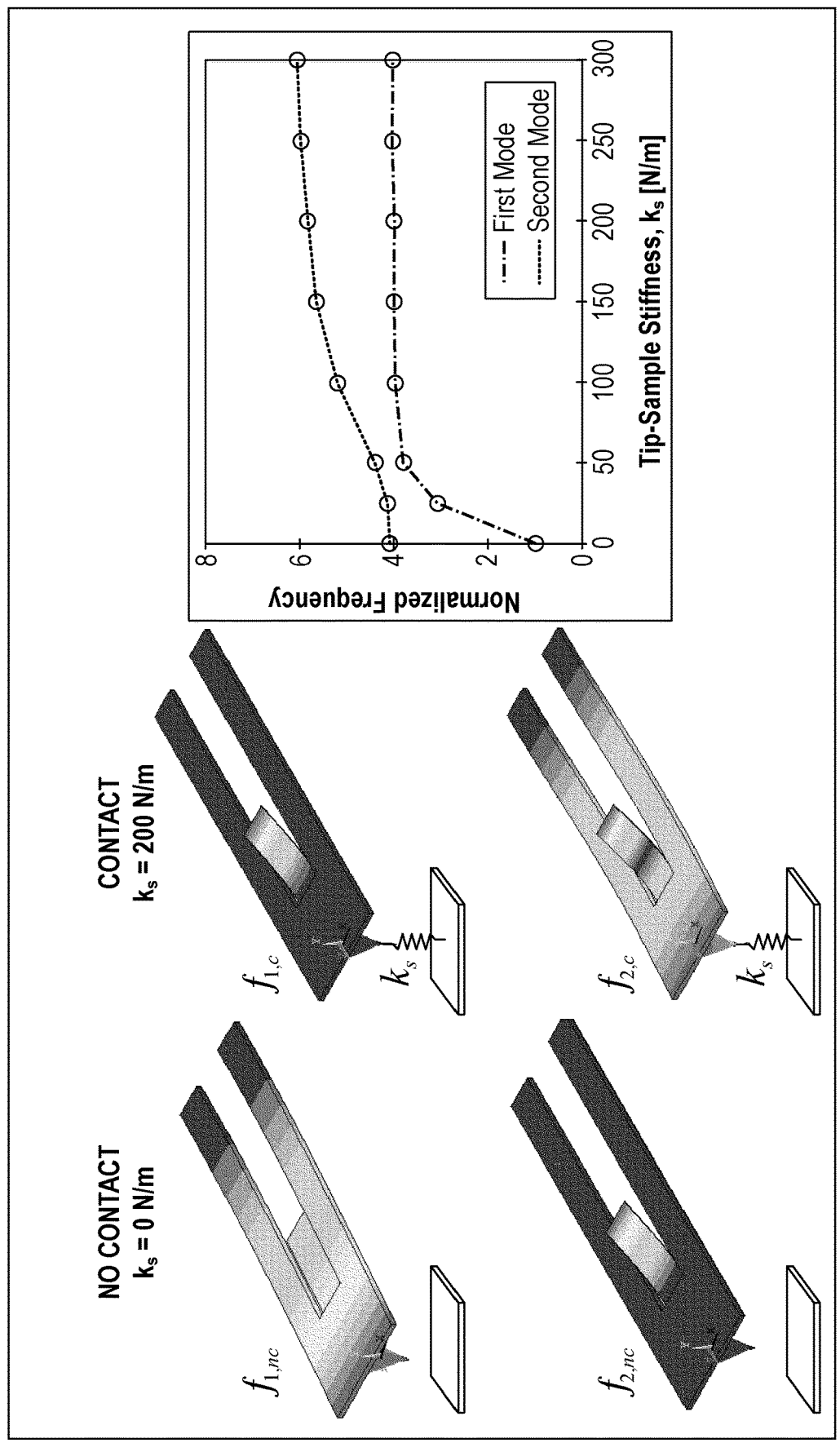
FIG. 8B illustrates finite element analysis simulations of the mode shapes and modal frequencies with respect to the tip-sample contact stiffness ($k_s$) of a cantilever system according to one embodiment of the invention.

To better understand the dynamics involving contact resonance in both a conventional cantilever and the inner-paddled cantilever design, linear modal analysis was performed using commercial finite element modeling software (ANSYS v14). The three-dimensional structures of the two systems were modeled based on their physical configurations. The modal analyses were performed with the cantilevers fixed at the base and simply supported by a linear spring element at the tip, representative of the tip-sample contact stiffness. In order to study the behavior of the cantilevers with respect to the contact conditions, the mode shapes of the systems and their corresponding natural frequencies were obtained while varying the stiffness of the spring element. FIGS. 8A-B show the simulation results for both cantilevers. Variations in the modal frequencies with respect to the tip-sample stiffness predicted by the finite element analysis simulations are shown for a conventional cantilever and the inner-paddled cantilever system. The behavior of the modal frequencies predicted by the finite element model agrees with the analytically obtained results, verifying the lumped parameter model. FIG. 8A shows the fundamental mode shape of a conventional cantilever for the non-contact (free oscillations, $k_s=0$) and contact ($k_s=200$ N/m) cases. The change in the boundary condition at the tip from free end to elastically restrained, results in changes in the mode shape and the corresponding resonant frequency. As the contact stiffness increases, the mode shape and corresponding resonant frequency continue to vary, once again demonstrating the strong dependence of the contact resonant frequency on the local mechanical contact conditions for a conventional cantilever. It is noteworthy that this change in the mode shapes and frequencies continues only until a certain critical contact stiffness, after which the cantilever will behave like a fixed-simply supported beam whose mode shapes and resonant frequencies are not affected by any further increase in the contact stiffness. However, this frequency saturates at higher values of contact stiffness, which are beyond the practical range realized experimentally.

FIG. 8B depicts the first and second mode shapes of the inner-paddled cantilever for the non-contact (free oscillations, $k_s=0$) and contact ($k_s=200$ N/m) cases. The first mode shape of the free oscillations corresponds to the base cantilever and inner paddle vibrating in-phase with nearly the same amplitudes. The second mode shape coincides with the base cantilever portion and inner paddle vibrating out-of-phase where only the oscillations of the inner paddle are observed while the oscillation amplitude of the base cantilever appears to be negligibly small. Initially (for smaller values of $k_s$), the change in the boundary condition affects the first mode shape and its corresponding natural frequency, whereas the second mode shape and its frequency are not affected because the dynamic motion is localized to the inner paddle, which is not directly connected to the tip. As the contact stiffness increases, however, the second mode frequency remains unchanged while the first mode frequency gradually increases to the point where the first and second mode frequencies are nearly the same. Further increases in the contact stiffness do not affect the first mode shape and its corresponding frequency, whereas the second mode shape and its frequency are now susceptible to further changes in the contact stiffness. It is interesting to note that the first mode frequency of the inner-paddled cantilever design saturates at a lower contact stiffness value as compared to a conventional cantilever, which is easily realizable in actual AFM operation. This observation emphasizes the advantageous of the design of the cantilever system 12 over the conventional AFM cantilever. The computational FE results fully agree with the previous analytical evaluation based on the ROM of FIG. 7C, thus validating the accuracy and predictive capacity of the proposed ROM for the dynamics of the inner-paddled cantilever in the considered frequency range.

Figure 9A:
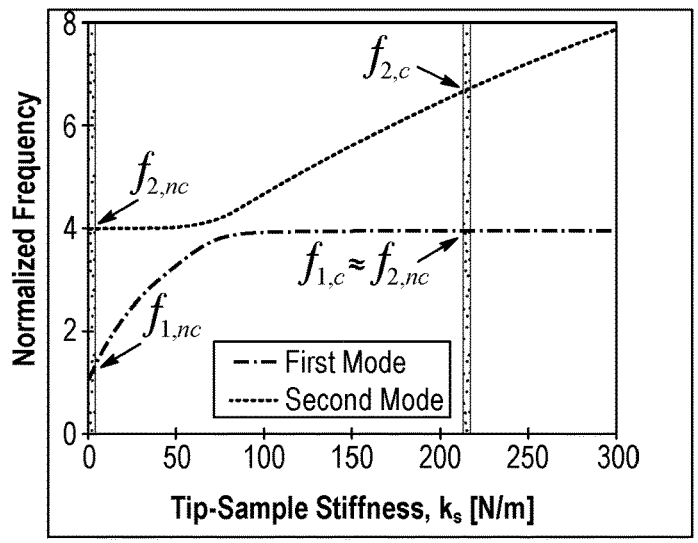
FIG. 9A illustrates variations of the analytically obtained modal frequencies of the reduced order model of FIG. 7C with respect to the tip-sample contact stiffness ($k_s$).
Figure 9B:
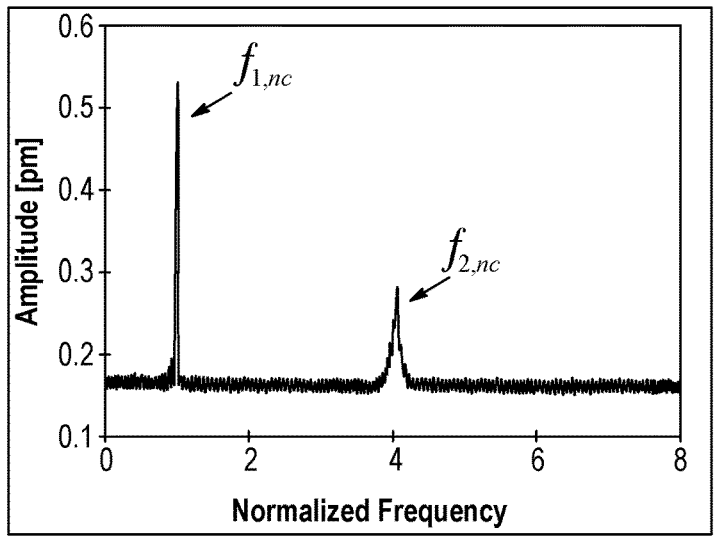
FIG. 9B illustrates the frequency spectrum of an inner-paddled cantilever system obtained experimentally by measuring the thermomechanical vibration when the tip is not in contact with the surface (corresponding to $k_s=0$ in FIG. 9A).
Figure 9C:
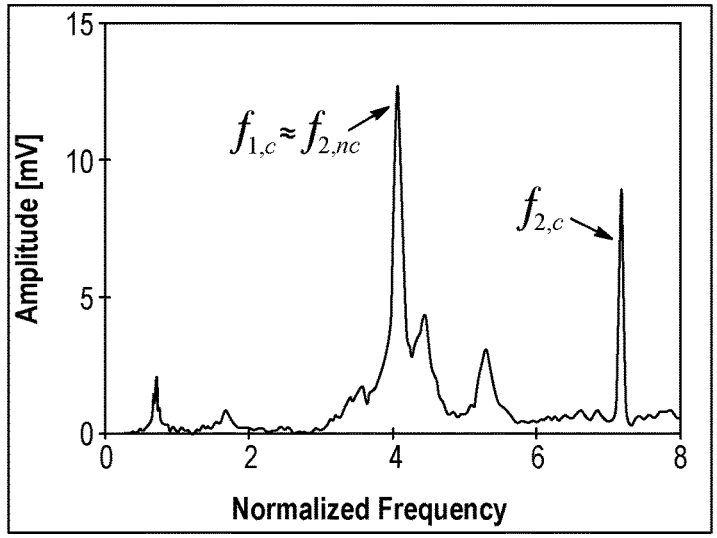
FIG. 9C illustrates the frequency response of the same inner-paddled cantilever system of FIG. 9B when the tip is in contact with a surface.

Furthermore, the analytically and numerically obtained results were validated by the experimental results depicted in FIGS. 9B-C. FIG. 9B shows the frequency spectrum of a fabricated paddled cantilever obtained by measuring the thermomechanical vibration when the tip is not in contact with the surface. Note that the frequency is normalized by the first mode frequency of the non-contact case (i.e., 135 kHz), corresponding to the normalized frequency of 1. The two dominant peaks observed at frequencies 135 kHz ($f_{1,nc}$ and 548 kHz ($f_{2,nc}$) correspond to the first and second modal frequencies, respectively, when $k_s$=0. In FIG. 9C, the frequency response of the paddle cantilever was obtained while the tip of this cantilever was in contact with a surface. We note that the first peak ($f_{1,c}$) observed in FIG. 9C, located at 548 kHz, matches the second modal frequency of the free response ($f_{2,c}$) in FIG. 9B. Therefore, the experimental results show good agreement with the theoretical predictions when comparing (i) the free resonance of FIG. 9B for the case of $k_s$=0 in FIG. 9A, and (ii) the contact resonance of FIG. 9C for the case of $k_s \approx 220$ N/m in FIG. 9A. These experimental results provide a final conclusive validation of the proposed concept based on the inner-paddled cantilever.

Figure 10:
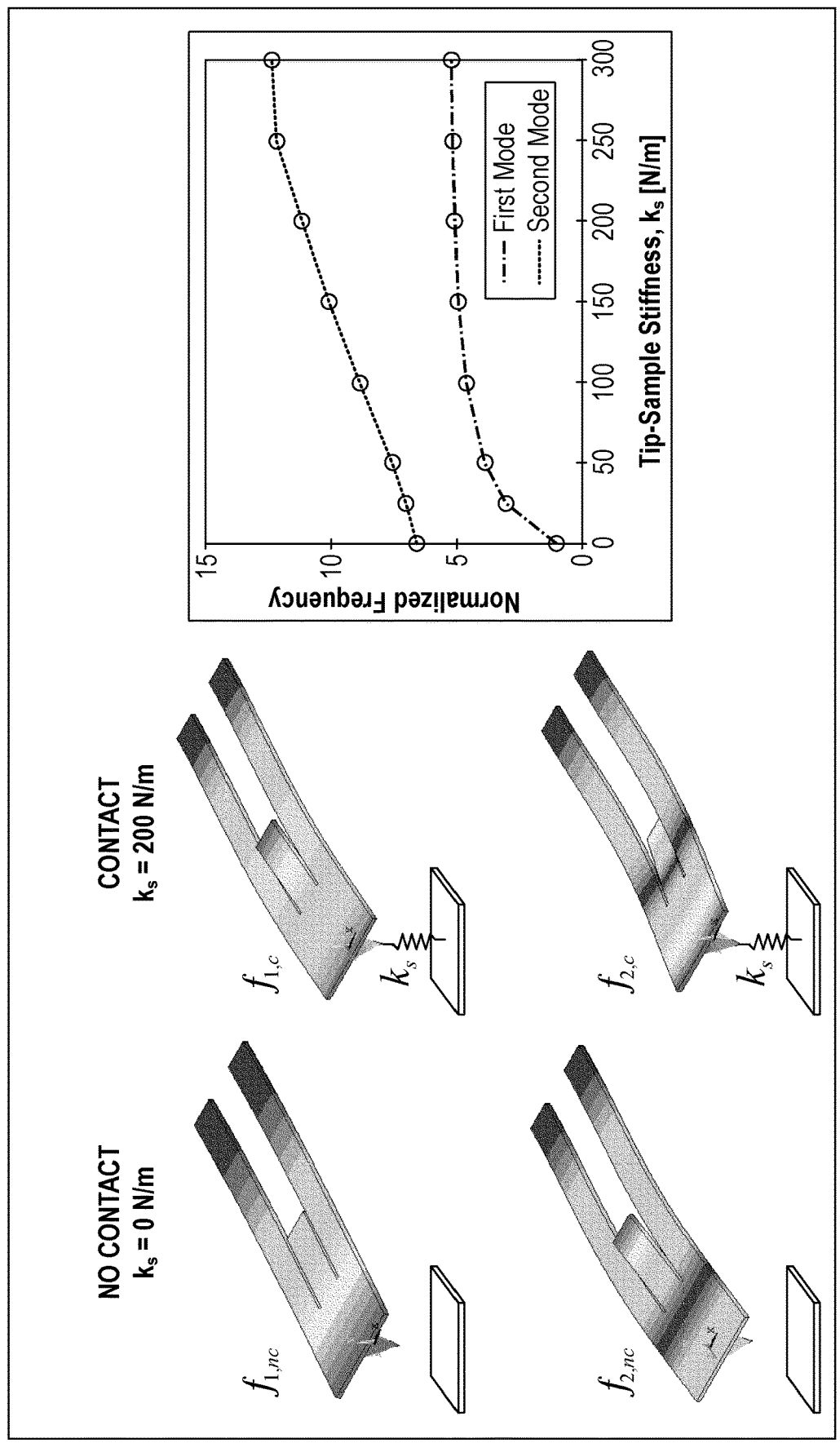
FIG. 10 illustrates finite element analysis simulations of the mode shapes and modal frequencies of an inner-paddled cantilever system with the inner paddle and the base cantilever portion having the same thickness.

The results discussed above compare the response of the cantilever system 12 to a unibody cantilever that does not have an inner paddle. In addition, a cantilever system with an inner paddle with the same thickness as the base cantilever was also studied. A finite element model simulation was performed to predict the dynamical behavior of such a cantilever system. FIG. 10 shows the mode shapes of the cantilever system corresponding to the first and second resonant frequencies for non-contact ($k_s$=0) and contact ($k_s$=200 N/m) cases as well as the behavior of the resonant frequencies with respect to the tip-sample stiffness as predicted by the finite element model. As the graph in FIG. 10 shows, there is a change in the cantilever system's mode shapes and corresponding resonant frequencies as the contact stiffness is varied. The dynamics of this cantilever system resembles that of a unibody cantilever system rather than a cantilever system consisting of two coupled oscillators. Consequently, when the tip is in contact with a surface, any variations in the tip-sample contact stiffness results in changes in the dynamics of the entire cantilever system (the base cantilever and the inner paddle) giving rise to a variable contact resonant frequency, much like in a conventional unibody (i.e., un-paddled) cantilever.

Figure 11B:
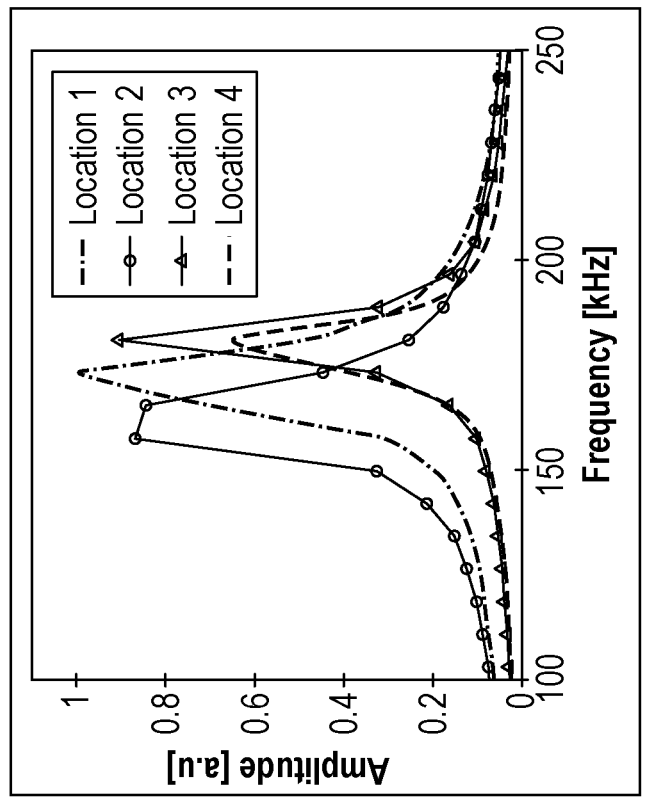
FIG. 11B illustrates variations in the contact resonant frequency with respect to the cantilever tip position.
Figure 11A:
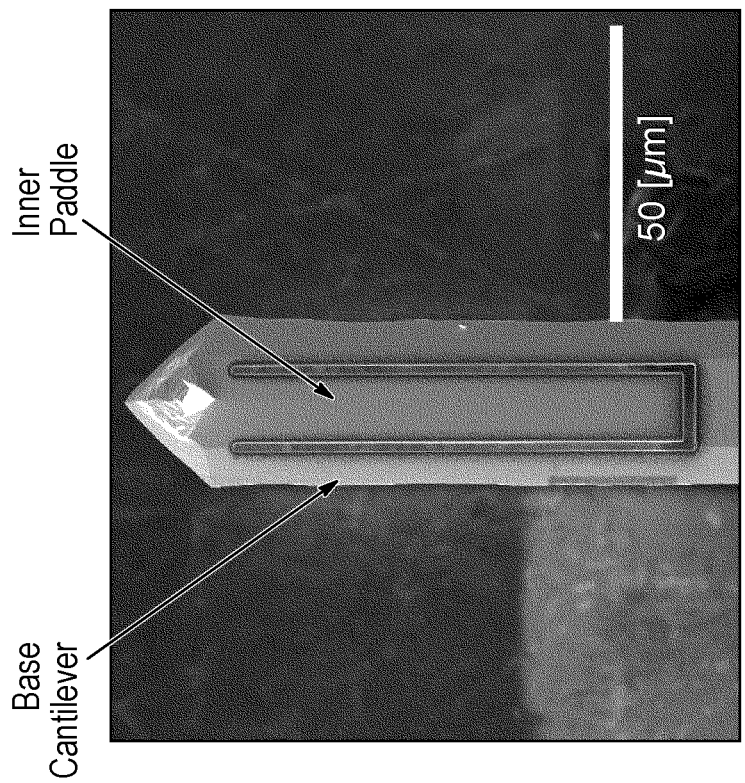
FIG. 11A is an SEM image of an inner-paddled cantilever with the inner paddle and the base cantilever portion having the same thickness.

To experimentally demonstrate the strong dependence of the contact resonant frequency on the tip-surface contact stiffness for such a system, a paddled-cantilever was fabricated by etching an NSC18/Pt (MikroMasch) commercial cantilever (thickness ~3 μm) with a focused ion beam (FIB) to create an internal paddle with the same thickness. The frequency response of the cantilever system was obtained at several locations on a PPLN sample while the cantilever tip was in contact with the surface. FIGS. 11A and 11B show a SEM image of the fabricated cantilever and its frequency responses on PPLN, respectively. In FIG. 11B, the four curves correspond to frequency responses at different tip locations on the surface of the PPLN sample. As predicted by the finite element model, strong variations in the contact resonant frequency are observed in FIG. 10. This variation in the contact resonant frequency is attributed to a varying tip-sample contact stiffness as the tip of the cantilever was moved from one location to another, resulting in a change in the dynamic behavior of the entire cantilever system. Thus, this result further supports the idea that when the dimensional parameters of the inner paddle and base cantilever are of the same order, the cantilever system's behavior is consistent with that of a unibody cantilever system.

Figure 12:
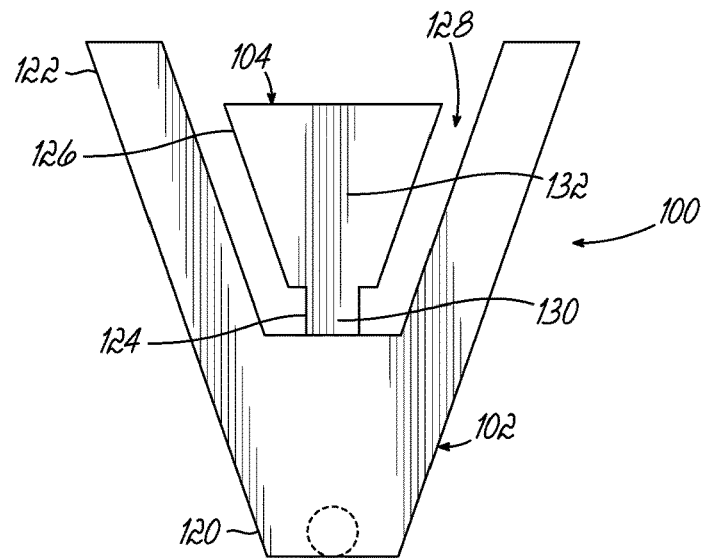
FIG. 12 is a top view of a cantilever system in accordance with a second embodiment of the invention.

The invention provides a second embodiment for a cantilever system. In lateral PFM, the in-plane component of polarization of the sample is detected as lateral (torsional) motion of the cantilever, whereas in vertical PFM, the out-of-plane component is detected as vertical (flexural) motion of the cantilever. When operated near resonance, both lateral and vertical PFM measurements are susceptible to undesirable artifacts caused by a varying resonant frequency due to changes in local contact stiffness. FIG. 12 illustrates a cantilever system 100 with a V-shaped base cantilever portion 102 and an inner paddle 104. Cantilever system 100 eliminates the effect of local contact stiffness on both the flexural and torsional resonant frequencies to be used in both vertical and lateral PFM. The inner paddle 104 is made of a nano-membrane suspended from the base cantilever portion 102. This embodiment assumes the base cantilever portion 102 and the inner paddle 104 vibrate in their own fundamental modes because of the appreciable distinction between the respective structural parameters. In this embodiment, the approximate thicknesses of the base cantilever portion 102 and inner paddle 104 is 500 nm and 300 nm, respectively.

Figure 13:
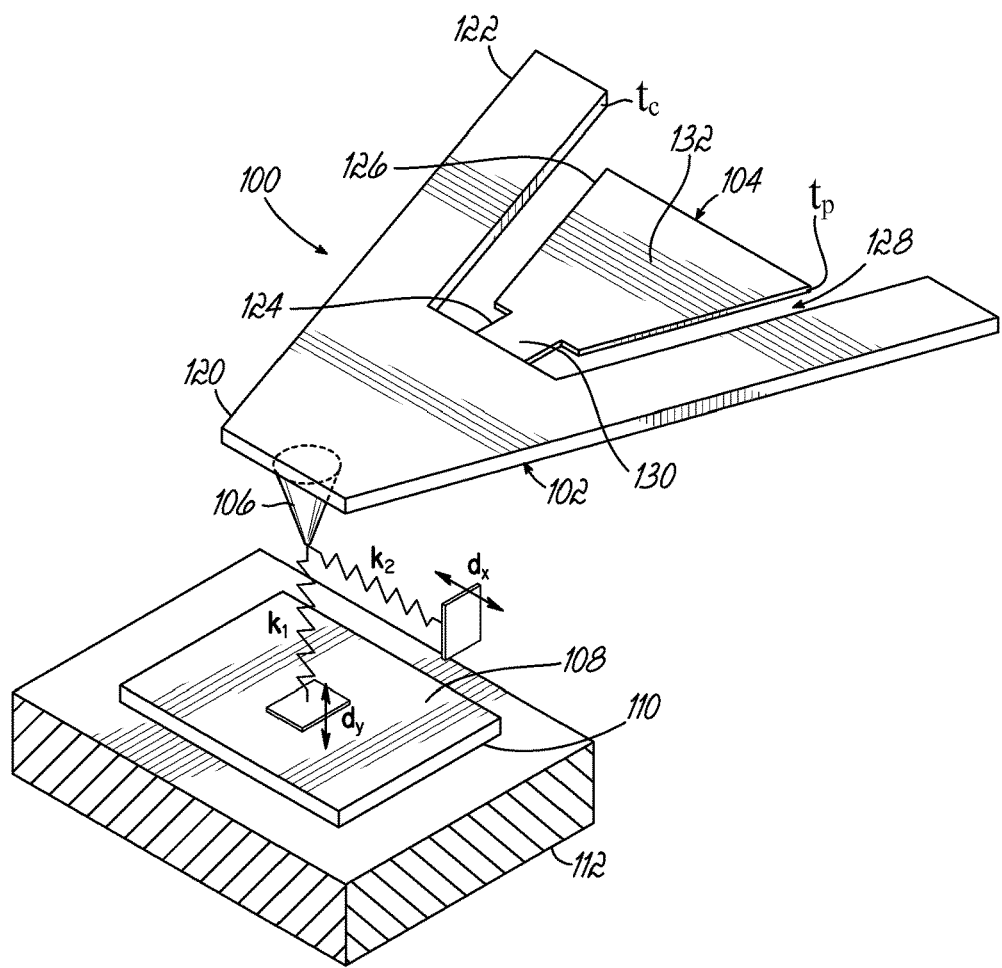
FIG. 13 is a perspective view of the cantilever system of FIG. 12 schematically interacting with a sample surface.

FIG. 13 shows the cantilever system 100 with a tip 106 protruding from the base cantilever portion 102. The tip 106 is schematic shown to be interacting with a surface 108 of sample 110 which is resting upon an XY table 112. Spring constants $k_1$ and $k_2$ represent the tip-surface contact stiffness in the vertical and lateral directions, respectively, and $d_y$ and $d_x$ denote the motion of the sample (functional response) in the vertical and lateral directions respectively.

With further reference to FIG. 12, base cantilever portion 102 has a first end 120 and a second end 122. The first end 120 of the base cantilever portion 102 is connected to the first end 120 of the base cantilever portion 102. The second end 122 supports the base cantilever portion 102 when the second end 122 is held by a holder (not shown) like holder 14 (FIG. 1). The inner paddle 104 has a first end 124 and a second end 126. The first end 124 of the inner paddle 104 is connected to the base cantilever portion 102 and the second end 126 is free to move relative to the base cantilever portion 102 within a generally trapezoidal-shaped cavity 128 of base cantilever portion 102. Inner paddle 104 is comprised of a connecting portion 130 and a generally trapezoid-shaped portion 132.

In one embodiment, the base cantilever portion 102 has an effective bending stiffness ($k_1$) relative to vertical deflections of the first end 120 of the base cantilever portion 102. Similarly, paddle 104 has an effective bending stiffness ($k_2$) relative to vertical deflections of the second end 126 of the paddle 104. The ratio of $k_1$ to $k_2$ is at least greater than 4, and preferably at least equal to or greater than 10. To achieve this ratio, the dimensions of the paddle 104, i.e., length, width, and thickness, may be controlled to achieve its reduced effective bending stiffness and enable the free motion of the paddle 104 while the base cantilever portion 102 is not deflected. In one embodiment, the thickness $t_p$ of inner paddle 42 is smaller compared to the thickness $t_c$ of the base cantilever portion 40 as illustrated in FIG. 13.

Figure 14:
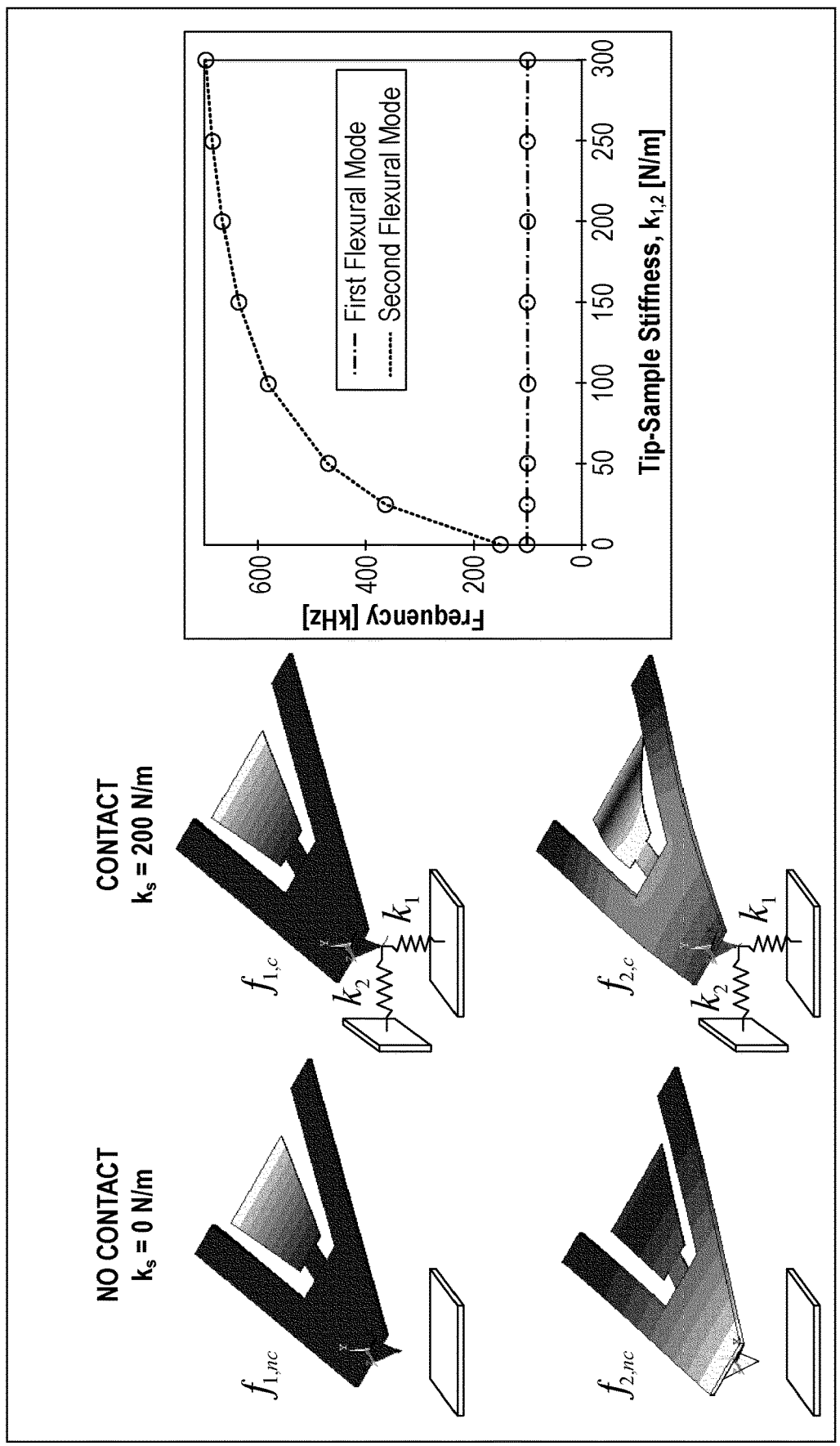
FIG. 14 illustrates the first and second flexural mode shapes from finite element analysis simulations of the cantilever system of FIG. 12 and the corresponding flexural modal frequencies with respect to the tip-surface contact stiffness.
Figure 15:
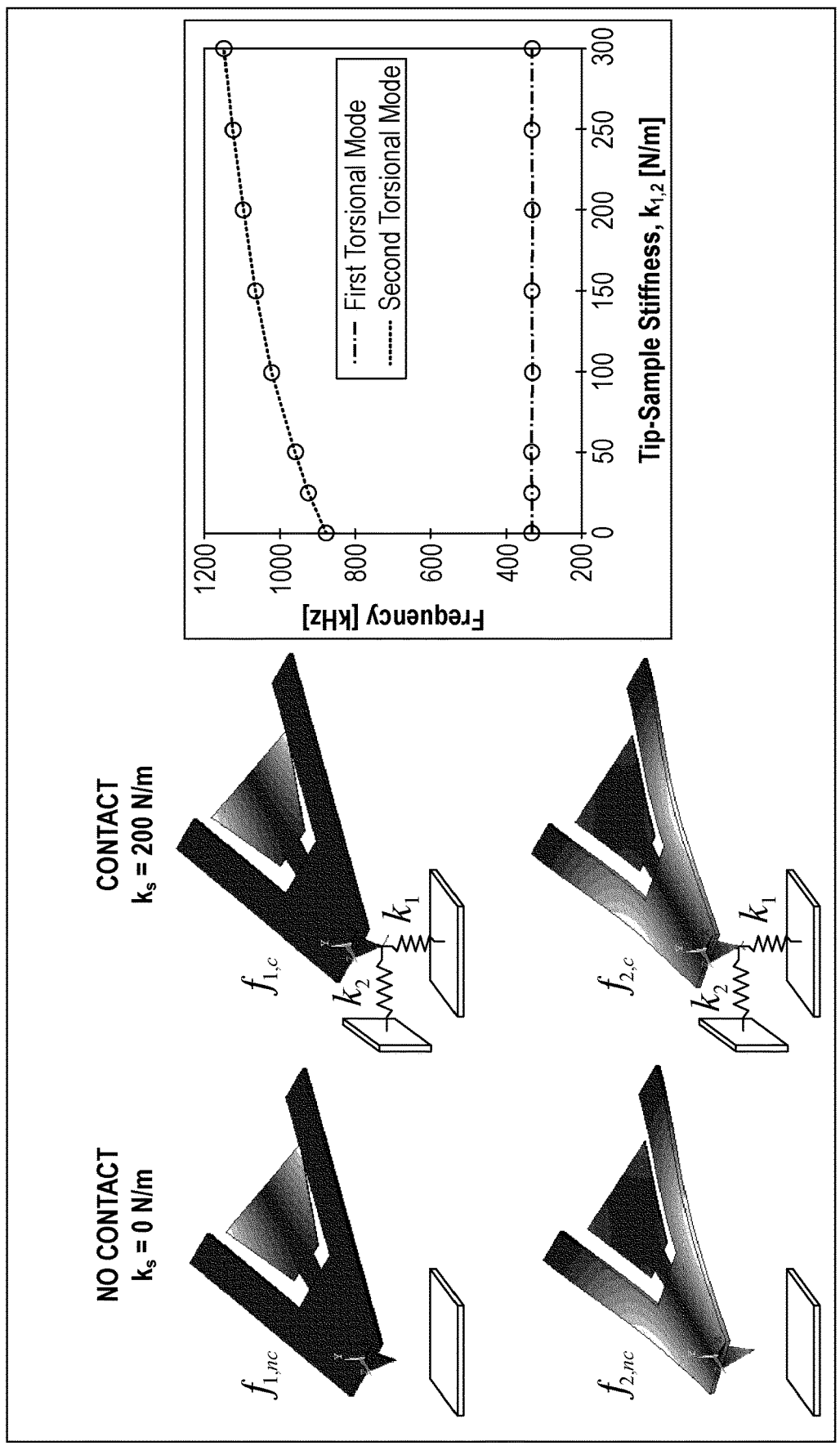
FIG. 15. illustrates first and second torsional mode shapes from finite element analysis simulations of the cantilever system of FIG. 12 and the corresponding torsional modal frequencies with respect to the tip-surface contact stiffness.

FIGS. 14 and 15 illustrate the results of finite element model simulations performed to predict the dynamical behavior of the cantilever system 100. For the simulations, $t_p$=1.6 and $t_c$=300 nm. FIGS. 14 and 15 show the flexural and torsional mode shapes of the cantilever system 100 corresponding to the first and second resonant frequencies for non-contact ($k_{1,2}$=0) and contact ($k_{1,2}$=200 N/m) cases as well as the behavior of the resonant frequencies with respect to the tip-sample stiffness ($k_{1,2}$) as predicted by the finite element model. Referring to the flexural modes in FIG. 14, the dynamic motion of the system is localized to the paddle in the second mode of the non-contact case ($k_{1,2}=0$) and then this motion is transferred to the first mode as the tip-surface contact stiffness ($k_{1,2}$) reaches a critical value when the tip makes contact with the surface, after which further increases in the contact stiffness have no effect in the mode shape or the corresponding resonant frequency. Such behavior illustrates effective decoupling between local contact stiffness variations and first flexural resonant frequency.

Referring to the torsional modes in FIG. 15, the second torsional mode and its corresponding resonant frequency are immune to any changes in the local contact stiffness because, as in the case of the flexural vibrations, the torsional vibrations of the second mode is localized to the paddle that is not in physical contact with the surface. Therefore, the corresponding torsional resonant frequency is independent of any local stiffness variations. This result demonstrates the efficacy of the design of the cantilever system 100 for vertical and lateral PFM imaging with reduced crosstalk between sample topography and functional response of the sample.

While the present invention has been illustrated by the description of specific embodiments thereof, and while these embodiments have been described in considerable detail, they are not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A device for sensing a force, comprising:
a cantilever having:
a base cantilever portion with a first end and a second end, the first end of the base cantilever portion having a protruding tip, the second end of the base cantilever portion supporting the base cantilever portion, and
a paddle with a first end and a second end, the first end of the paddle being connected to the base cantilever portion, the second end of the paddle being free to move relative to the base cantilever portion;
a generator configured for providing an input signal to a sample surface; and
a detector configured for measuring a response signal, wherein the response signal represents a deflection of the cantilever in response to a physical change of the sample surface responsive to the input signal;
wherein the base cantilever portion has an effective bending stiffness, $k_1$, and the paddle has an effective bending stiffness, $k_2$, a ratio of the effective bending stiffness, $k_1$, to the effective bending stiffness, $k_2$, is at least 4, wherein the response signal exhibits an invariant contact resonance frequency.

2. The device of claim 1 wherein the ratio of the effective bending stiffness, $k_1$, to the effective bending stiffness, $k_2$, is at least equal to or greater than 10.

3. The device of claim 1 wherein the base cantilever portion has a thickness, $t_c$, and the paddle has a thickness, $t_p$, wherein the thickness $t_p$ is no greater than one half of $t_c$.

4. The device of claim 3 wherein the thickness $t_p$ is no greater than one third of $t_c$.

5. The device of claim 1 wherein the response signal exhibits the invariant contact resonance frequency for different topographical features and/or material features on the sample surface.

6. The device of claim 1 wherein the detector is further configured to analyze the response signal to determine a topographical response and a functional response, wherein topographical and functional information in the response signal are decoupled.

7. The device of claim 1 wherein the input signal is an electrical signal.

8. The device of claim 1 wherein the input signal is optical or thermal radiation.

9. The device of claim 1 wherein the base cantilever portion is a V-shaped base cantilever portion.

* * * * *

UNITED STATES PATENT AND TRADEMARK OFFICE
CERTIFICATE OF CORRECTION

PATENT NO. : 10,656,175 B2
APPLICATION NO. : 15/896199
DATED : May 19, 2020
INVENTOR(S) : Sajith M. Dharmasena et al.

It is certified that error appears in the above-identified patent and that said Letters Patent is hereby corrected as shown below:

In the Specification

Column 1, Lines 11-14 insert the Government Support Clause:
--This invention was made with government support under CMMI1619801 & CMMI1463558 awarded by National Science Foundation. The government has certain rights in the invention--

Signed and Sealed this
Eleventh Day of August, 2020

Andrei Iancu
*Director of the United States Patent and Trademark Office*